United States Patent
Bali et al.

(10) Patent No.: US 12,507,221 B2
(45) Date of Patent: Dec. 23, 2025

(54) METHODS AND APPARATUS FOR SELECTING A CONTROL CHANNEL TO REDUCE OR AVOID COLLISIONS

(71) Applicant: Charter Communications Operating, LLC, St. Louis, MO (US)

(72) Inventors: Ramneek Bali, Aurora, CO (US); Elliott Hoole, Parker, CO (US); Alec Hampton, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 357 days.

(21) Appl. No.: 17/712,385

(22) Filed: Apr. 4, 2022

(65) Prior Publication Data
US 2023/0319798 A1 Oct. 5, 2023

(51) Int. Cl.
  *H04W 72/0453* (2023.01)
  *H04B 17/318* (2015.01)
  *H04W 16/14* (2009.01)

(52) U.S. Cl.
  CPC ...... *H04W 72/0453* (2013.01); *H04B 17/318* (2015.01); *H04W 16/14* (2013.01)

(58) Field of Classification Search
  CPC . H04W 72/0453; H04W 16/14; H04B 17/318
  See application file for complete search history.

(56) References Cited

U.S. PATENT DOCUMENTS

| | | | |
|---|---|---|---|
| 2018/0254875 A1* | 9/2018 | Wakabayashi | H04L 5/0053 |
| 2020/0014454 A1* | 1/2020 | Guo | H04B 7/088 |
| 2021/0376894 A1* | 12/2021 | Cha | H04B 7/088 |
| 2023/0413323 A1* | 12/2023 | Zhang | H04W 76/19 |

* cited by examiner

*Primary Examiner* — Huy D Vu
*Assistant Examiner* — Robert Ma
(74) *Attorney, Agent, or Firm* — Straub & Straub; Michael P. Straub; Stephen T. Straub

(57) ABSTRACT

Interference on control channels using shared spectrum is managed by a base station without the use of centralized spectrum control device. A base station monitors a plurality of alternative control channels and measures received signal strength energy corresponding to each of the plurality of alternative candidate control channels. A received signal strength indicator (RSSI) is measured for each channel-beam combination. An average RSSI value is determined for each candidate control channel. A candidate control channel can be, and sometimes is, removed from further consideration for selection based on one or more RSSI based exclusion criteria. Among the remaining candidate control channels, a control channel with the lowest average RSSI is selected. The base station uses the selected control channel to transmit control information via wide control channel beams and uses one or more of the other channels to transmit data via narrow data channel beams.

20 Claims, 17 Drawing Sheets

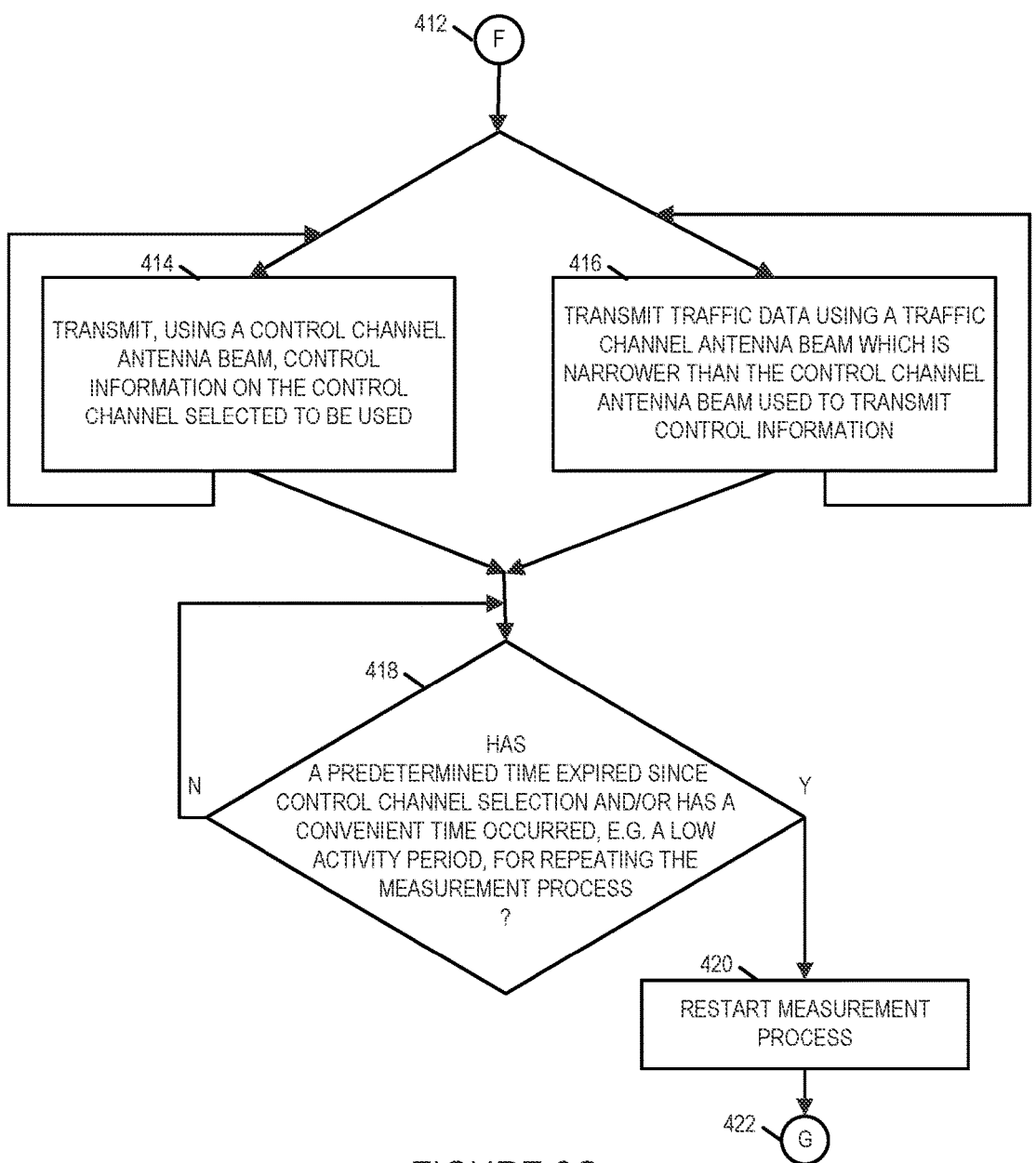

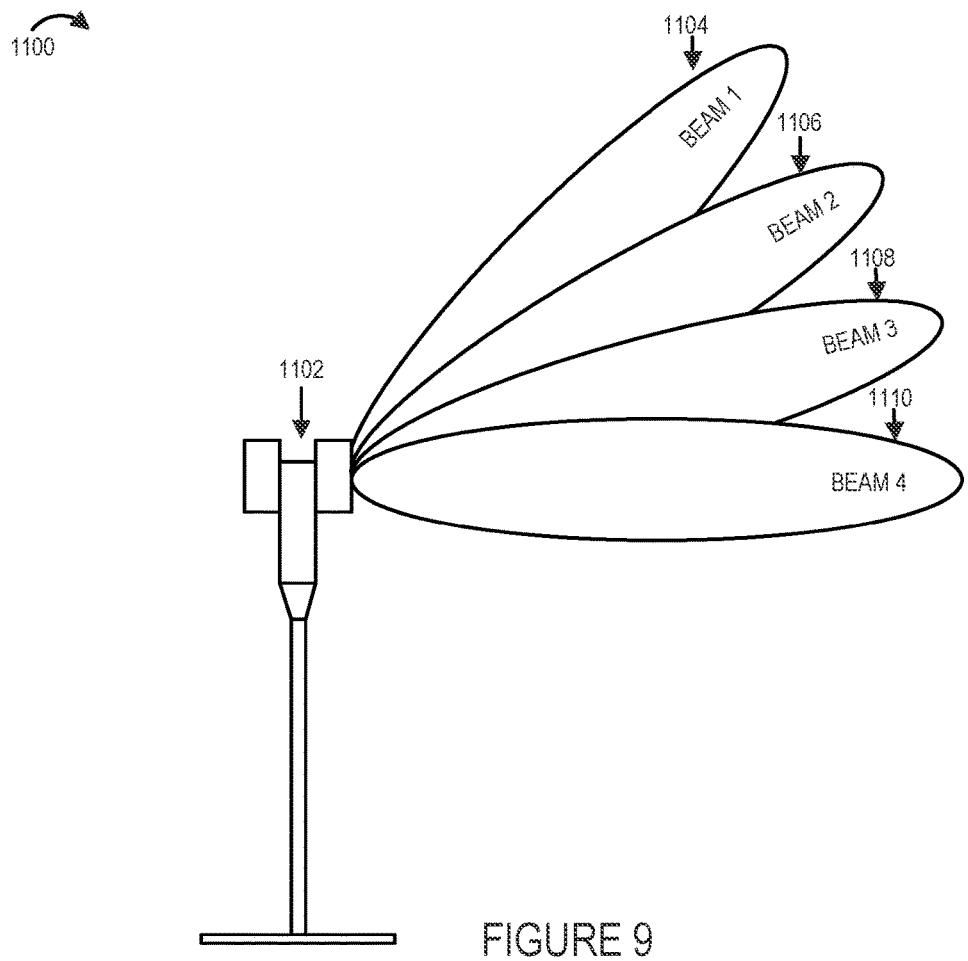
FIGURE 9
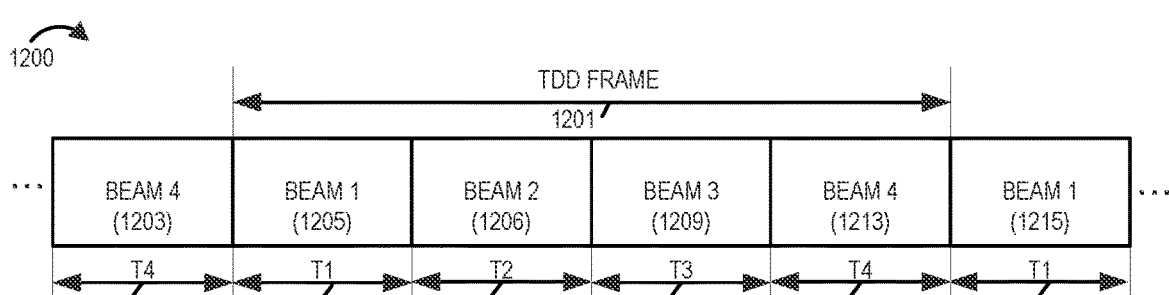
FIGURE 10
| | BEAM 1 | BEAM 2 | BEAM 3 | BEAM 4 | CHANNEL RSSI |
|---|---|---|---|---|---|
| CHANNEL 1 | -90 dBm | -90 dBm | -80 dBm | -90 dBm | -87.5 dBm |
| CHANNEL 2 | -88 dBm | -88 dBm | -88 dBm | -86 dBm | -87.5 dBm |
FIGURE 11

METHODS AND APPARATUS FOR SELECTING A CONTROL CHANNEL TO REDUCE OR AVOID COLLISIONS

FIELD

The present application relates to wireless communications, and more particularly, to methods and apparatus for shared spectrum interference management and control channel selection.

BACKGROUND

600 MHz of shared bandwidth (37.0-37.6 GHz) is available for commercial use and is already supported by the global eco system as part of the "39 GHz" band spanning 37-40 GHz (formalized as band n260 in 3GPP). A service provider can use the shared spectrum to supplement other deployments, e.g., N48 deployments.

The FCC intends to develop a framework for sharing the band between commercial and federal Department of Defense (DOD) users. The current rule is site-based registration, licensed by rule, co-equal with Federal operator throughout the band.

Having a Spectrum Access System (SAS) type sharing mechanism will put a lot of burden on deployments. Highly directional beams that will be used in the lower 37 GHz band allow multiple operators to use the same spectrum without interference. The challenge in terms of interference will be in control beams, which are wider in nature and generally there are 1-4 control beams. These control beams are used for cell selection in idle mode. The wider nature of these control beams makes a control beam susceptible to interference from other operators on the same channel.

Based on the above discussion, there is need for new methods and apparatus to solve or remediate the control beam interference problem issue with regard to shared channels. It would be desirable if the new methods and apparatus supported control beam selection in a manner that did not require the need for a centralized control device such as a SAS to manage control channel interference.

SUMMARY

Methods and apparatus for interference management and control channel selection in deployments in which shared spectrum is available to be used are described. Interference on control channels using shared spectrum is managed by a base station implementing a control channel selection process intended to reduce or avoid interference. The methods can be used without a centralized spectrum control device. In various embodiments, a base station, e.g., a sector base station supporting beamforming, monitors a plurality of alternative control channels and measures received signal strength energy corresponding to each of the plurality of alternative candidate control channels. In some embodiments, a received signal strength indicator (RSSI) is measured for each channel-beam combination. For each candidate control channel, an average RSSI value for the channel is determined. A candidate channel can be removed from consideration for selection to be used for transmission of control information based on a high average channel RSSI value and/or based on a high individual channel-beam combination RSSI value for the channel. A channel with the lowest average RSSI among the remaining channels, after applying exclusions, is selected to be used by the base station for the transmission of control information. In the case, in which two or more remaining candidate channels have the same lowest average RSSI, a channel is selected based on a predetermined control channel selection scheme. For example, in one embodiment, the base station selects, in the event of the tie, the lowest numbered channel, which corresponds to the lowest frequency, wherein the lowest frequency channel is expected to experience the lowest level of interference from devices in spectrum adjacent to the shared bandwidth, which the set of candidate control channels. The base station uses the selected control channel to transmit control information via wide control channel beams and uses one or more of the other channels to transmit data via narrow data channel beams.

An exemplary communications method, in accordance with some embodiments, comprises: performing received signal strength indicator (RSSI) measurements for beams corresponding to multiple control channels being considered for selection, said performing RSSI measurements including performing RSSI measurements for beams of a first control channel and performing RSSI measurements for beams of a second control channel; generating an average control channel RSSI value for each individual control channel under consideration for selection from RSSI values of individual beams; applying one or more RSSI based channel exclusion criteria; excluding, from further consideration for selection, any control channels which satisfied an RSSI based channel exclusion criterion; and selecting, from one or more channels remaining under consideration for selection, a control channel to be used for communication of control signals.

An exemplary base station, e.g. a base station supporting beamforming, in accordance some embodiments, comprises: a wireless receiver; a plurality of antennas or antenna elements; and a processor configured to: operate the base station to perform received signal strength indicator (RSSI) measurements for beams corresponding to multiple control channels being considered for selection, said performing RSSI measurements including performing RSSI measurements for beams of a first control channel and performing RSSI measurements for beams of a second control channel; generate an average control channel RSSI value for each individual control channel under consideration for selection from RSSI values of individual beams; apply one or more RSSI based channel exclusion criteria; exclude, from further consideration for selection, any control channels which satisfied an RSSI based channel exclusion criterion; and select, from one or more channels remaining under consideration for selection, a control channel to be used for communication of control signals.

Numerous variations on the described methods and apparatus are possible and while several embodiments are described in detail it should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2G is a seventh part of flowchart of an exemplary method of operating a base station, e.g., a sector base station, in accordance with an exemplary embodiment.

FIG. 2 comprises the combination of FIG. 2A, FIG. 2B, FIG. 2C, FIG. 2D, FIG. 2E, FIG. 2F and FIG. 2G.

FIG. 9 illustrates an exemplary base station, e.g., a sector base station, and four control channel beams, in accordance with an exemplary embodiment.

FIG. 10 illustrates an exemplary TDD frame including four different time intervals, each of the four different timing intervals corresponding to a different beam.

FIG. 11 illustrates and example in which two alternative control channels has the same average channel RSSI value; however, one of the two alternative control channels is rejected as a candidate for selection to be used to communicate control signals because an individual beam channel measurement exceeded a predetermined exclusion threshold.

DETAILED DESCRIPTION

Figure 1:
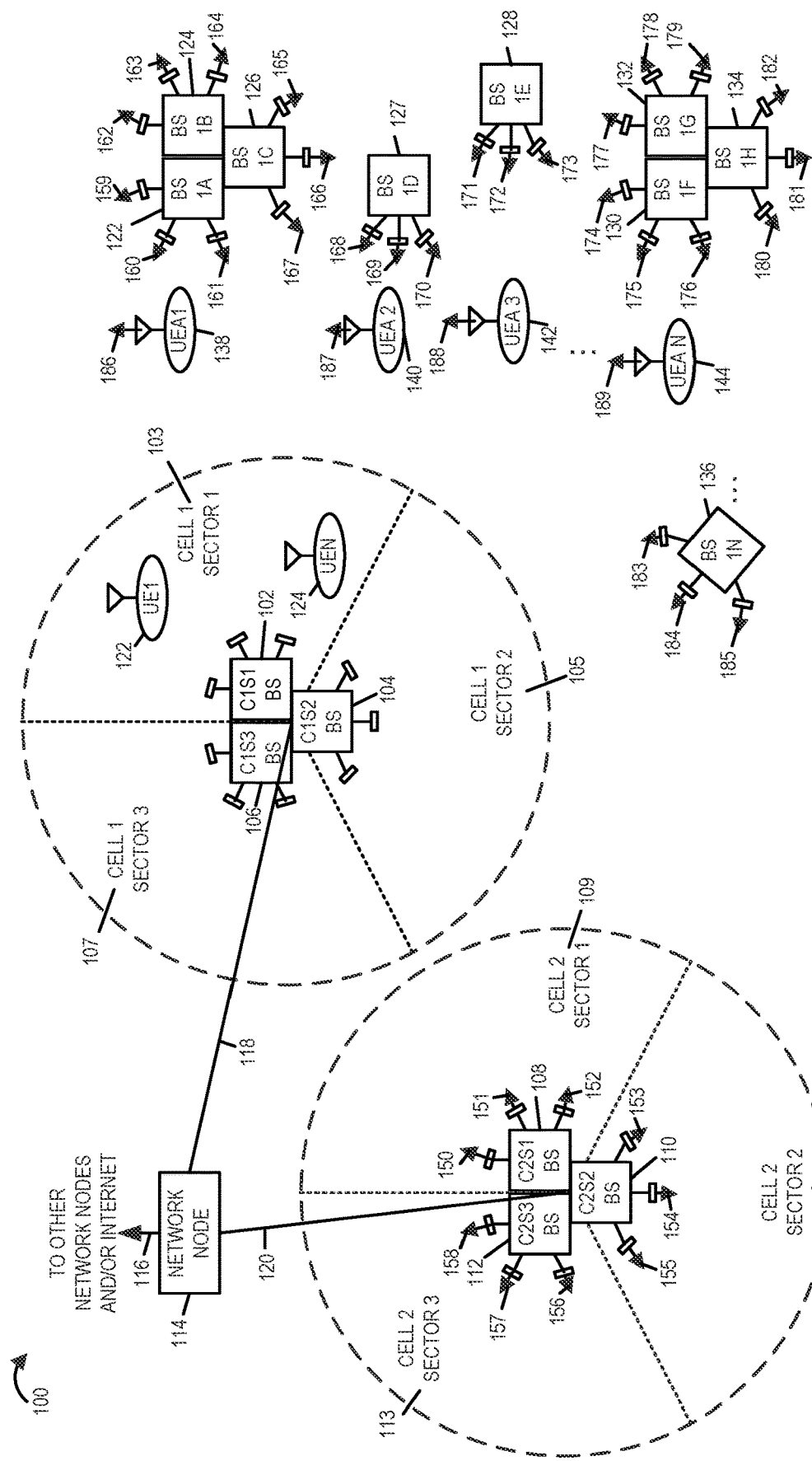
FIG. 1 is a drawing of an exemplary communications system in accordance with an exemplary embodiment.

FIG. 1 is a drawing of an exemplary communications system 100 in accordance with an exemplary embodiment.

Exemplary communications system 100 includes a plurality of sector base stations (cell 1 sector 1 (C1S1) base station (BS) 102, cell 1 sector 2 (C1S2) base station (BS) 104, cell 1 sector 3 (C1S3) base station (BS) 106, cell 2 sector 1 (C2S1) base station (BS) 108, cell 2 sector 2 (C2S2) base station (BS) 110, cell 2 sector 3 (C2S3) base station (BS) 112. Each of the sector base stations (102, 104, 106, 108, 110, 112) has a corresponding coverage area (cell 1 sector 1 103, cell 1 sector 2 105, cell 1 sector 3 107, cell 2 sector 1 109, cell 2 sector 2 111, cell 3 sector 3 113. In various embodiments, each of the sector base stations (102, 104, 106, 108, 110, 112) includes a plurality of antennas or antenna elements and supports beamforming. In some such embodiments, each of sector base stations may, and sometimes times does, support transmission of control information on a set of control beams, e.g., 4 control beams, with different time slots corresponding to different beams. In various embodiments, each of the sector base station may, and sometimes does, select a control channel, e.g., a 100 MHz channel, to use for communicating control signals, from among a plurality of alternative control channels, e.g., 6 alternative channels, based on RSSI measurements and one or more channel exclusion criteria in accordance with an exemplary embodiment, e.g., without the need or assistance from a spectrum access system (SAS) to provide centralized coordination.

Exemplary system 100 further includes network node 114, which is coupled to the cell 1 sector base stations (102, 104, 106) via communications link 118. Network node 114 is further coupled to the cell 2 sector base stations (108, 110, 112) via communications link 120. Network node 114 is coupled to other network nodes and/or the Internet via communications link 116. Exemplary communications system 100 further includes a plurality of user equipments (UEs) (UE 1 122, . . . , UE N 124). The UEs (122, . . . , 124), e.g., mobile wireless communications devices, may move throughout the system 100 and be connected, via wireless communications links, to different sector base stations (102, 104, 106, 108, 110, 112) of the system 100 at different times. In various embodiments, the sector base stations (102, 104, 106, 108, 110, 112), network node 114, and UE (122, . . . 124) are part of the a first service provider network. Different sector base station may, and sometimes have, selected to use different control channels.

FIG. 1 further illustrates exemplary communications devices, e.g. base stations (BS1A 122, BS1B 124, BS1C 126, BS1D 127, BS1E 128, BS1F 130, BS1G 132, BS1H 134, . . . , BS1N 136), each including a plurality of antennas or antenna elements, and UEs (UEA1 138, UEA2 140, UEA3 185, UEAN 144), which are not part of the first service provider network, but which may, and sometimes do, transmit signals (e.g., interference from the perspective of first service provider network base stations) which are received and included in RSSI measurements performed by a sector base station of the first service provider network, e.g. cell 1 sector 1 base station 102, as part of measuring RSSI on beams of alternative control channels being evaluated for selection.

Exemplary signals ((150, 151, 152), (153, 154, 155), (156, 157, 158)) are transmitted by ((C2S1 BS 108), (C2S2BS 110), (C2S3 BS 112)), respectively. Exemplary signals ((159, 160, 161), (162, 163, 164), (165, 166, 167)) are transmitted by (BS1A 122, BS1B 124, BS1C 126), respectively. Exemplary signals ((168, 169, 170), (171, 172, 173)) are transmitted by (BS1D 126, BS1E 127), respectively. Exemplary signals ((174, 175, 176), (177, 178, 179), (180, 181, 182)) are transmitted by (BS1F 130, BS1G 132, BS1H 134), respectively. Exemplary signals (183, 184, 185) are transmitted by BS1N 136. Exemplary signals (186, 187, 188, 189) are transmitted by UEs (138, 140, 142, 144), respectively. Different base station may transmit using different frequencies and/or with different timing structures.

A cell sector base station, e.g. C1S1 BS 102, monitors for an receives signals on a set of bands corresponding to each potential candidate control channels and performs RSSI measurements corresponding to each combination of channel and beam, processes the RSSI measurements, e.g. obtaining an average RSSI value for each potential candidate control channel, applies channel exclusion criteria, selects a control channel to use for the communication of control signal, and then implements the selection.

Figure 2A:
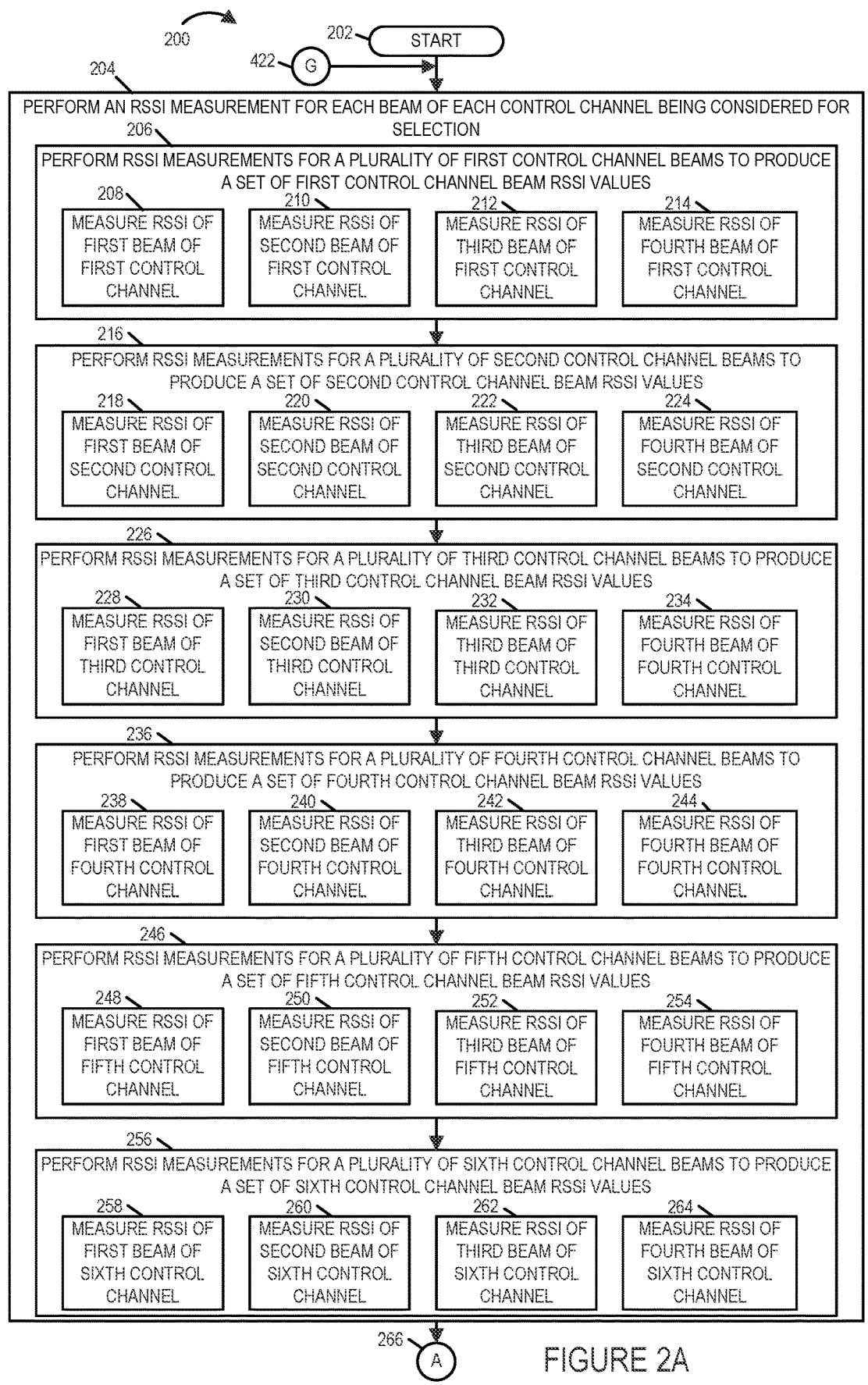
FIG. 2A is a first part of flowchart of an exemplary method of operating a base station, e.g., a sector base station, in accordance with an exemplary embodiment.
Figure 2B:
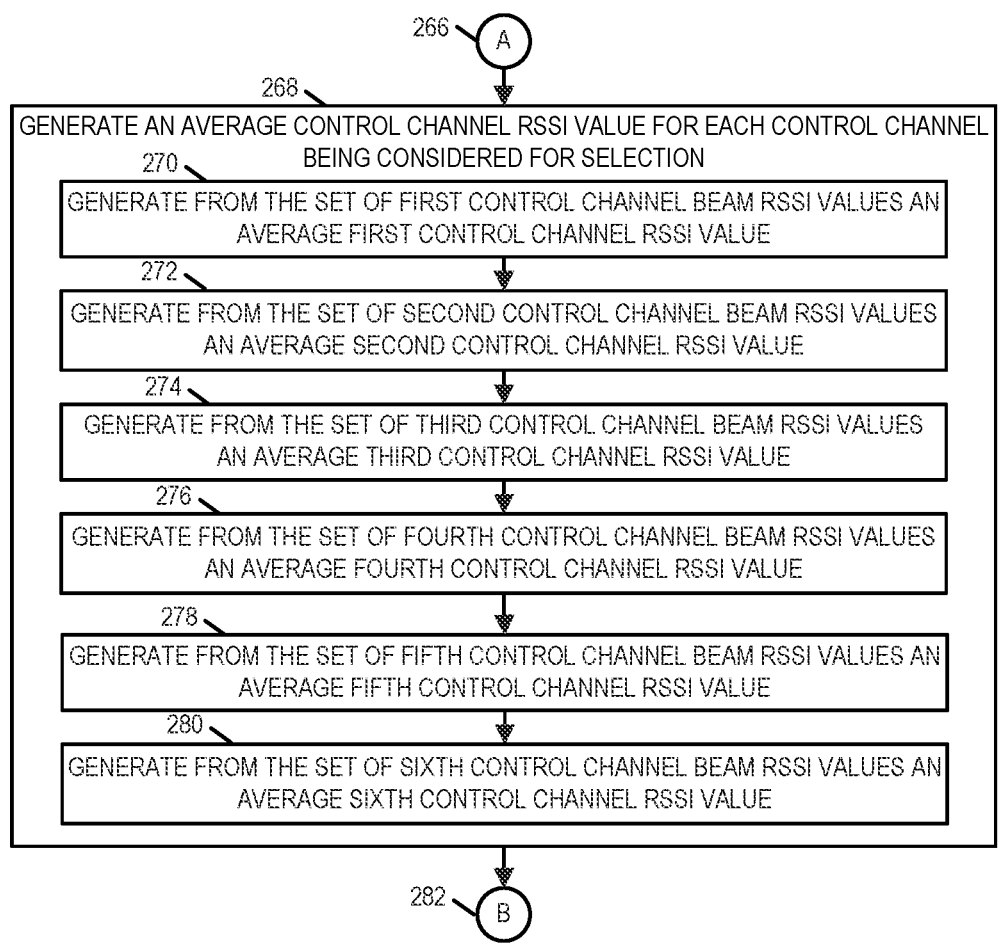
FIG. 2B is a second part of flowchart of an exemplary method of operating a base station, e.g., a sector base station, in accordance with an exemplary embodiment.
Figure 2C:
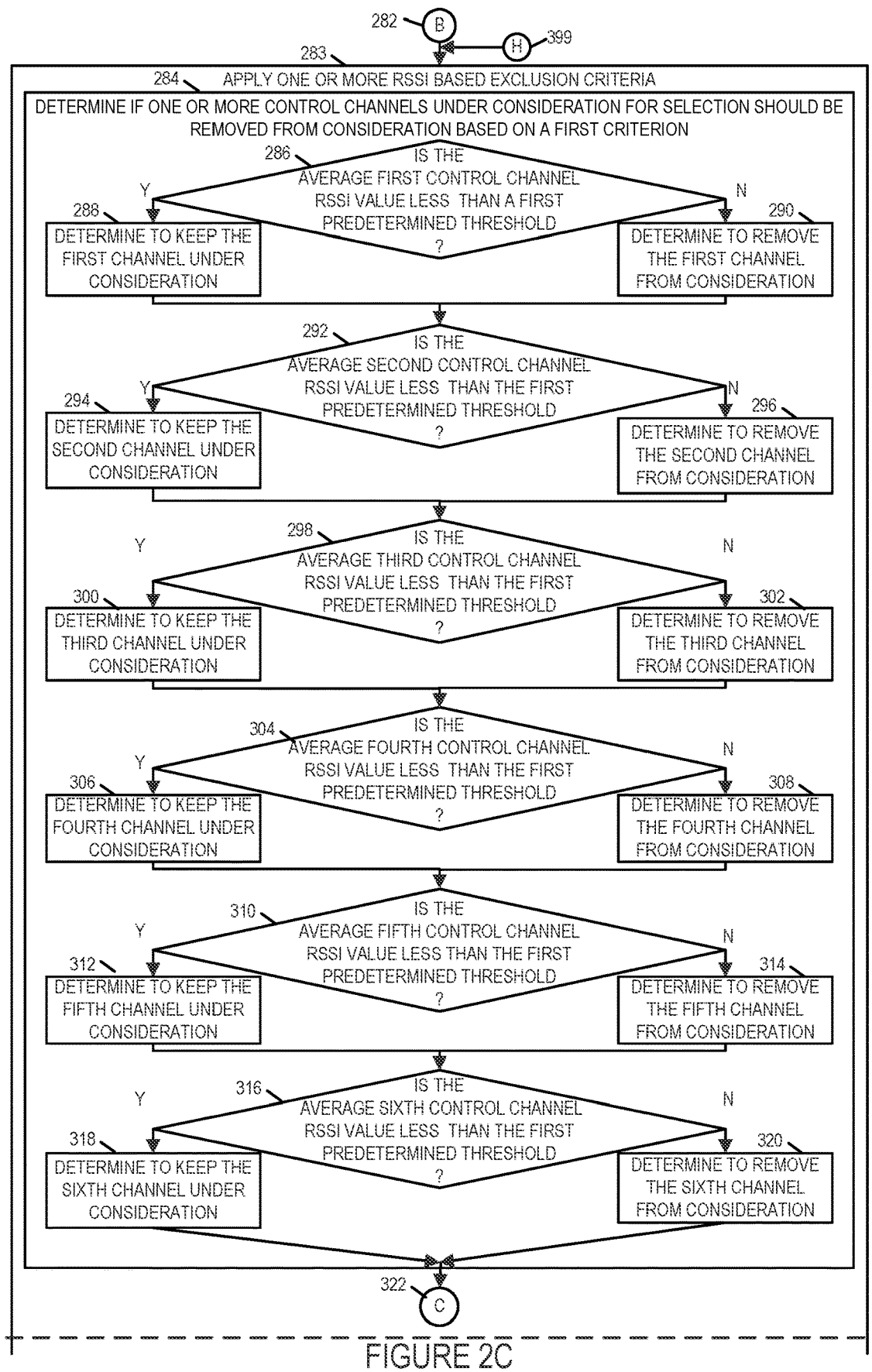
FIG. 2C is a third part of flowchart of an exemplary method of operating a base station, e.g., a sector base station, in accordance with an exemplary embodiment.
Figure 2D:
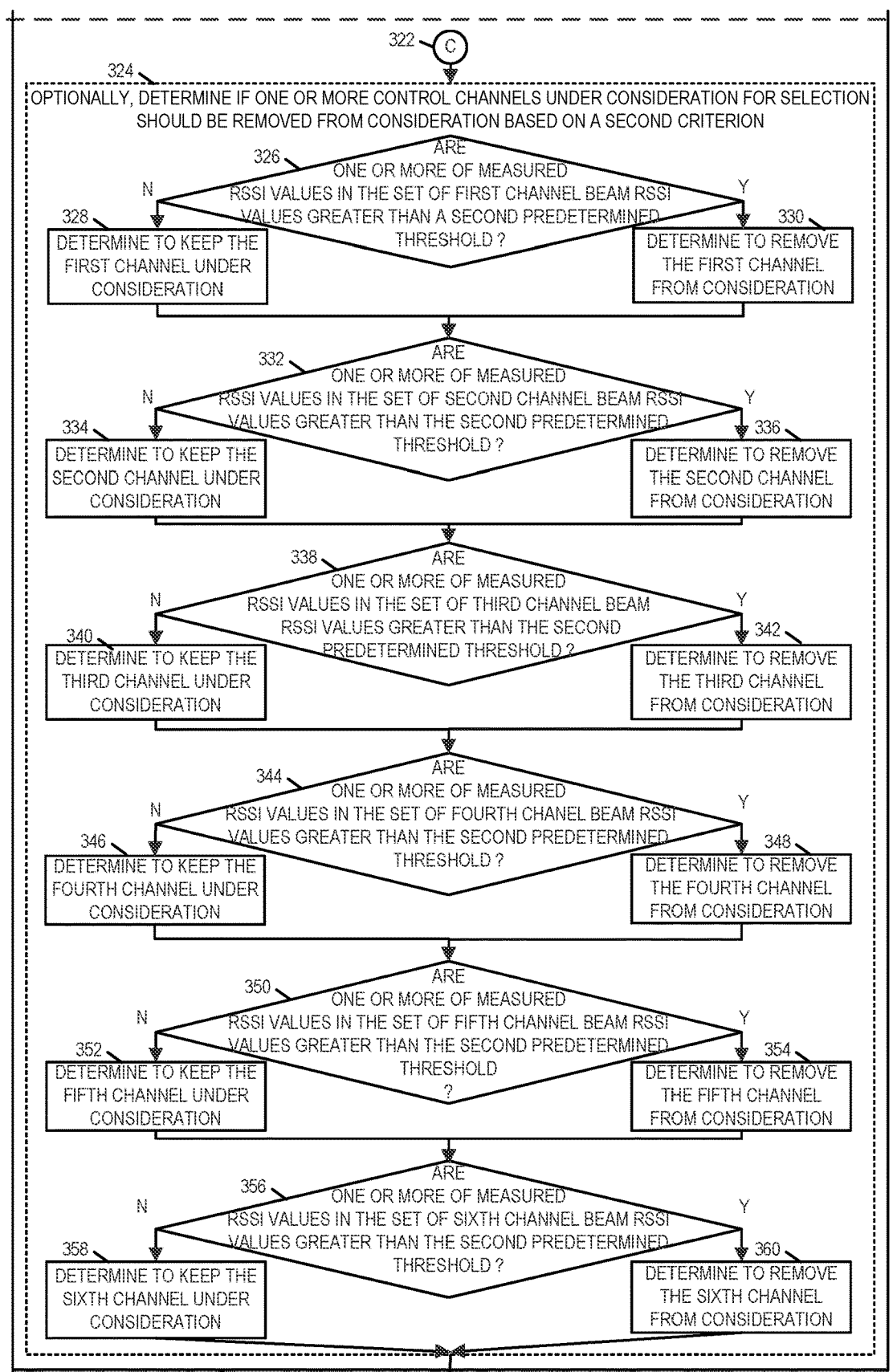
FIG. 2D is a fourth part of flowchart of an exemplary method of operating a base station, e.g., a sector base station, in accordance with an exemplary embodiment.
Figure 2E:
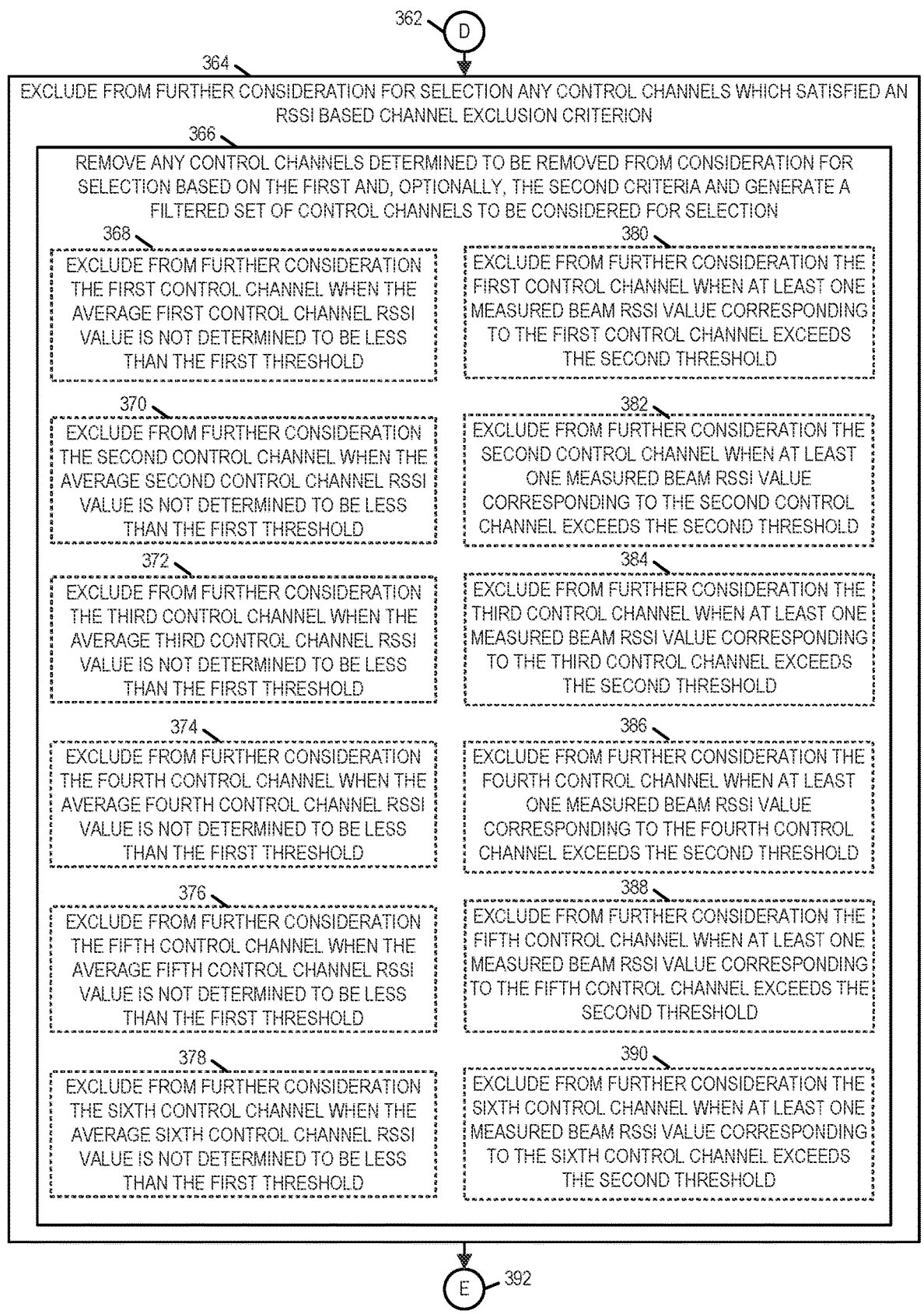
FIG. 2E is a fifth part of flowchart of an exemplary method of operating a base station, e.g., a sector base station, in accordance with an exemplary embodiment.
Figure 2F:
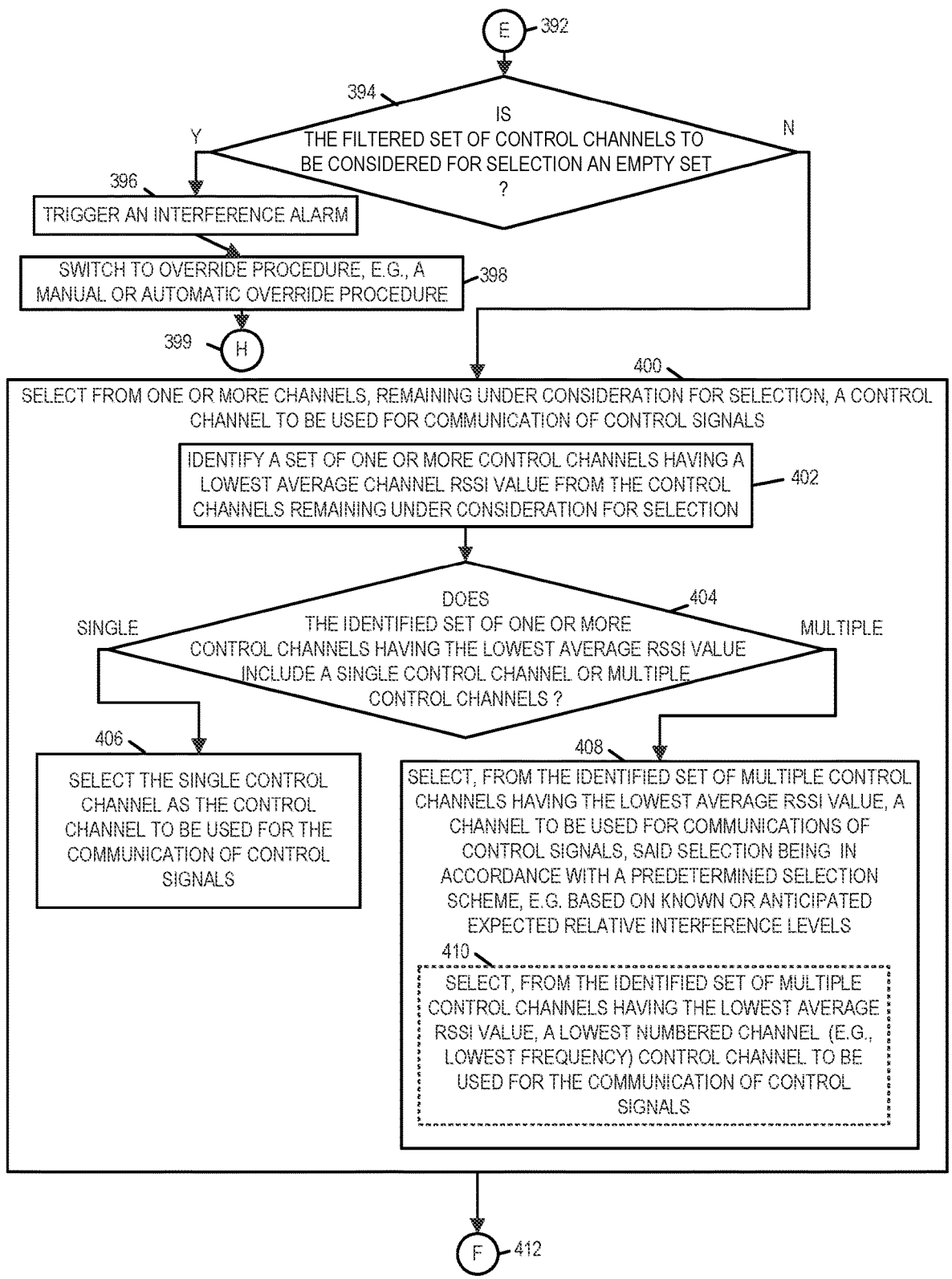
FIG. 2F is a sixth part of flowchart of an exemplary method of operating a base station, e.g., a sector base station, in accordance with an exemplary embodiment.

FIG. 2, comprising the combination of FIG. 2A, FIG. 2B, FIG. 2C, FIG. 2D, FIG. 2E, FIG. 2F and FIG. 2G, is a flowchart 200 of an exemplary method of operating a base station, e.g., a sector base station, in accordance with an exemplary embodiment. FIG. 2A includes exemplary steps for measuring RSSI for each beam of each control channel being considered for selection. FIG. 2B includes steps for generating an average RSSI value for each channel. FIG. 2C includes steps for identifying control channels to be removed from consideration for selection based on average RSSI and a first criterion. FIG. 2D includes steps for identifying control channels to be removed from consideration for selection based on an induvial beam RSSI value corresponding to a channel being too high with respect to a second criterion. FIG. 2E includes steps in which the channels identified to be excluded, based on one or more RSSI criteria, from further consideration for selection are excluded from further consideration for selection. FIG. 2F includes steps in which a single control channel is selected to be used for the communications of control signals from among the remaining control channels under consideration following any exclusion(s), said selection including identifying one or more of the remaining control channels having a lowest average RSSI value and a predetermined selection scheme for breaking ties, e.g., select the lowest number control channel (lowest frequency channel). FIG. 2G includes steps in which the base station uses the selected control channel to transmit control channel data, e.g. via wide control channel beams, uses other channels for transmitting traffic data, e.g., via narrow beams, and at later time restarts the beam acquisition process for a new selection of a control channel to be used, e.g., to adjust for any changes in conditions and/or to optimize, e.g. in response to a new base station coming on-line, which increase interference to a candidate control channel, or a device dropping out, which decreases interference to a candidate control channel. The base station, implementing exemplary method of flowchart 200 of FIG. 2 is, e.g., any of the base stations 102, 104, 106, 108, 110, 112 of system 100 of FIG. 1 and/or base station 500 of FIG. 3.

Operation of the exemplary method starts in step 202, in which the base station is powered on and initialized. Operation proceeds from start step 202 to step 204.

In step 204 the base station performs Received Signal Strength Indicator (RSSI) measurements for each beam of each control channel being considered for selection. Step 204 includes steps 206, 216, 226, 236, 246 and 256. In step 206 the base station performs RSSI measurements for a plurality of first control channel beams to produce a set of first control channel beams RSSI values. Step 206 includes steps 208, 210, 212 and 214. In step 208 the base station measures RSSI of a first beam of a first control channel. In step 210 the base station measures RSSI of a second beam of the first control channel. In step 212 the base station measures RSSI of a third beam of the first control channel. In step 214 the base station measures RSSI of a fourth beam of the first control channel.

Step 216 includes steps 218, 220, 222 and 224. In step 218 the base station measures RSSI of a first beam of a second control channel. In step 220 the base station measures RSSI of a second beam of the second control channel. In step 222 the base station measures RSSI of a third beam of the second control channel. In step 224 the base station measures RSSI of a fourth beam of the second control channel.

Step 226 includes steps 228, 230, 232 and 234. In step 228 the base station measures RSSI of a first beam of a third control channel. In step 230 the base station measures RSSI of a second beam of the third control channel. In step 232 the base station measures RSSI of a third beam of the third control channel. In step 234 the base station measures RSSI of a fourth beam of the third control channel.

Step 236 includes steps 238, 240, 242 and 244. In step 238 the base station measures RSSI of a first beam of a fourth control channel. In step 240 the base station measures RSSI of a second beam of the fourth control channel. In step 242 the base station measures RSSI of a third beam of the fourth control channel. In step 244 the base station measures RSSI of a fourth beam of the fourth control channel.

Step 246 includes steps 248, 250, 252 and 254. In step 248 the base station measures RSSI of a first beam of a fifth control channel. In step 250 the base station measures RSSI of a second beam of the fifth control channel. In step 252 the base station measures RSSI of a third beam of the fifth control channel. In step 254 the base station measures RSSI of a fourth beam of the fifth control channel.

Step 256 includes steps 258, 260, 262 and 264. In step 258 the base station measures RSSI of a first beam of a sixth control channel. In step 260 the base station measures RSSI of a second beam of the sixth control channel. In step 262 the base station measures RSSI of a third beam of the sixth control channel. In step 264 the base station measures RSSI of a fourth beam of the sixth control channel. Operation proceeds from step 204, via connecting node A 266 to step 268.

In step 269 the base station generates an average control channel RSSI value for each control channel being considered for selection. Step 268 includes steps 270, 272, 274, 276, 278 and 280. In step 270 the base station generates, from the set of first control channel beam RSSI values, an average first control channel RSSI value. In step 272 the base station generates, from the set of second control channel beam RSSI values, an average second control channel RSSI value. In step 274 the base station generates, from the set of third control channel beam RSSI values, an average third control channel RSSI value. In step 276 the base station generates, from the set of fourth control channel beam RSSI values, an average fourth control channel RSSI value. In step 278 the base station generates, from the set of fifth control channel beam RSSI values, an average fifth control channel RSSI value. In step 280 the base station generates, from the set of sixth control channel beam RSSI values, an average sixth control channel RSSI value. Operation proceeds from step 268, via connecting node B 282, to step 283.

In step 283 the base station applies one or more RSSI based exclusion criteria. Step 283 includes steps 284 and step 324. In step 284 the base station determines if one or more control channels under consideration for selection should be removed from consideration based on a first criterion. Step 284 includes steps 286, 288, 290, 292, 294, 296, 298, 300, 302, 304, 306, 308, 310, 312, 314, 316, 318 and 320.

In step 286 the base station determines, e.g., by comparison, if the average first control channel RSSI value is less than a first predetermined threshold. If the determination of step 286 is that the average first control channel RSSI value is less than the first predetermined threshold, then operation proceeds from step 286 to step 288, in which the base station determines to keep the first channel under consideration. However, if the determination of step 286 is that the average first control channel RSSI value is not less than the first predetermined threshold, then operation proceeds from step 286 to step 290, in which the base station determines to remove the first channel from consideration. Operation proceeds from step 288 or step 290 to step 292.

In step 292 the base station determines, e.g., by comparison, if the average second control channel RSSI value is less than the first predetermined threshold. If the determination of step 292 is that the average second control channel RSSI value is less than the first predetermined threshold, then operation proceeds from step 292 to step 294, in which the base station determines to keep the second channel under consideration. However, if the determination of step 292 is that the average second control channel RSSI value is not less than the first predetermined threshold, then operation proceeds from step 292 to step 296, in which the base station determines to remove the second channel from consideration. Operation proceeds from step 294 or step 296 to step 298.

In step 298 the base station determines, e.g., by comparison, if the average third control channel RSSI value is less than the first predetermined threshold. If the determination of step 298 is that the average third control channel RSSI value is less than the first predetermined threshold, then operation proceeds from step 298 to step 300, in which the base station determines to keep the third channel under consideration. However, if the determination of step 298 is that the average third control channel RSSI value is not less than the first predetermined threshold, then operation proceeds from step 298 to step 302, in which the base station determines to remove the third channel from consideration. Operation proceeds from step 300 or step 302 to step 304.

In step 304 the base station determines, e.g., by comparison, if the average fourth control channel RSSI value is less than the first predetermined threshold. If the determination of step 304 is that the average fourth control channel RSSI value is less than the first predetermined threshold, then operation proceeds from step 304 to step 306, in which the base station determines to keep the fourth channel under consideration. However, if the determination of step 304 is that the average fourth control channel RSSI value is not less than the first predetermined threshold, then operation proceeds from step 304 to step 308, in which the base station determines to remove the fourth channel from consideration. Operation proceeds from step 306 or step 308 to step 310.

In step 310 the base station determines, e.g., by comparison, if the average fifth control channel RSSI value is less than the first predetermined threshold. If the determination of step 310 is that the average fifth control channel RSSI value is less than the first predetermined threshold, then operation proceeds from step 310 to step 312, in which the base station determines to keep the fifth channel under consideration. However, if the determination of step 310 is that the average fifth control channel RSSI value is not less than the first predetermined threshold, then operation proceeds from step 310 to step 314, in which the base station determines to remove the fifth channel from consideration. Operation proceeds from step 312 or step 314 to step 316.

In step 316 the base station determines, e.g., by comparison, if the average sixth control channel RSSI value is less than the first predetermined threshold. If the determination of step 316 is that the average sixth control channel RSSI value is less than the first predetermined threshold, then operation proceeds from step 316 to step 318, in which the base station determines to keep the sixth channel under consideration. However, if the determination of step 316 is that the average sixth control channel RSSI value is not less than the first predetermined threshold, then operation proceeds from step 316 to step 320, in which the base station determines to remove the sixth channel from consideration. Operation proceeds from step 318 or step 320, via connecting node C 322 to step 324.

Step 324 is an optional step, which is included in some embodiments and bypassed in other embodiments. In step 324 the base station determines if one or more control channels under consideration for selection should be removed from consideration based on a second criterion. Step 324 includes steps 326, 328, 330, 332, 334, 336, 338, 340, 342, 344, 346, 348, 350, 352, 354, 356, 358 and 360.

In step 326 the base station determines if one or more of the measured RSS values in the set of first beam RSSI values are greater than a second predetermined threshold. If the determination of step 326 is that one or more of the measured RSS values in the set of first channel beam RSSI values are greater than the second predetermined threshold, then operation proceeds from step 326 to step 330, in which the base station determines to remove the first channel from consideration. However, if the determination of step 326 is that none of the measured RSS values in the set of first channel beam RSSI values are greater than the second predetermined threshold, then operation proceeds from step 326 to step 328, in which the base station determines to keep the first channel under consideration. Operation proceeds from step 328 or step 330 to step 332.

In step 332 the base station determines if one or more of the measured RSS values in the set of second channel beam RSSI values are greater than a second predetermined threshold. If the determination of step 332 is that one or more of the measured RSS values in the set of second channel beam RSSI values are greater than the second predetermined threshold, then operation proceeds from step 332 to step 336, in which the base station determines to remove the second channel from consideration. However, if the determination of step 332 is that none of the measured RSS values in the set of second channel beam RSSI values are greater than the second predetermined threshold, then operation proceeds from step 332 to step 334, in which the base station determines to keep the second channel under consideration. Operation proceeds from step 334 or step 336 to step 338.

In step 338 the base station determines if one or more of the measured RSS values in the set of third channel beam RSSI values are greater than the second predetermined threshold. If the determination of step 338 is that one or more of the measured RSS values in the set of third channel beam RSSI values are greater than the second predetermined threshold, then operation proceeds from step 338 to step 342, in which the base station determines to remove the third channel from consideration. However, if the determination of step 338 is that none of the measured RSS values in the set of third channel beam RSSI values are greater than the second predetermined threshold, then operation proceeds from step 338 to step 340, in which the base station determines to keep the third channel under consideration. Operation proceeds from step 340 or step 342 to step 344.

In step 344 the base station determines if one or more of the measured RSS values in the set of fourth channel beam RSSI values are greater than the second predetermined threshold. If the determination of step 344 is that one or more of the measured RSS values in the set of fourth channel beam RSSI values are greater than the second predetermined threshold, then operation proceeds from step 344 to step 348, in which the base station determines to remove the fourth channel from consideration. However, if the determination of step 344 is that none of the measured RSS values in the set of fourth channel beam RSSI values are greater than the second predetermined threshold, then operation proceeds from step 344 to step 346, in which the base station determines to keep the fourth channel under consideration. Operation proceeds from step 346 or step 348 to step 350.

In step 350 the base station determines if one or more of the measured RSS values in the set of fifth channel beam RSSI values are greater than the second predetermined threshold. If the determination of step 350 is that one or more of the measured RSS values in the set of fifth channel beam RSSI values are greater than the second predetermined threshold, then operation proceeds from step 350 to step 352, in which the base station determines to remove the fifth channel from consideration. However, if the determination of step 350 is that none of the measured RSS values in the set of fifth channel beam RSSI values are greater than the second predetermined threshold, then operation proceeds from step 350 to step 352, in which the base station determines to keep the fifth channel under consideration. Operation proceeds from step 352 or step 354 to step 356.

In step 356 the base station determines if one or more of the measured RSS values in the set of sixth channel beam RSSI values are greater than the second predetermined threshold. If the determination of step 356 is that one or more of the measured RSS values in the set of sixth channel beam RSSI values are greater than the second predetermined threshold, then operation proceeds from step 356 to step 360, in which the base station determines to remove the sixth channel from consideration. However, if the determination of step 356 is that none of the measured RSS values in the set of sixth channel beam RSSI values are greater than the second predetermined threshold, then operation proceeds from step 356 to step 358, in which the base station determines to keep the sixth channel under consideration. Operation proceeds from step 358 or step 360, via connecting node D 362 to step 364.

In step 364 the base station excludes from further consideration for selection any control channel(s) which satisfied an RSSI based exclusion criterion. Step 364 includes step 366 in which the base station removes any control channels determined to be removed from consideration for selection base son the first, and optionally, second criteria and generates a filtered set of control channel (e.g., set of remaining control channels) to be considered for selection to be used to communicate control information. Step 366 may, and sometimes does, include one or more of steps 368, 370, 372, 374, 376, 378. 380. 382, 384, 386, 388 and 390, e.g., depending upon the results (determinations) of step 283.

In step 368 the base station excludes from further consideration the first control channel when the average first control channel RSSI is not determined to be less than the first threshold (e.g., the average first control channel RSSI is determined to be greater than or equal to the first threshold). In step 370 the base station excludes from further consideration the second control channel when the average second control channel RSSI is not determined to be less than the first threshold (e.g., the average second control channel RSSI is determined to be greater than or equal to the first threshold). In step 372 the base station excludes from further consideration the third control channel when the average third control channel RSSI is not determined to be less than the first threshold (e.g., the average third control channel RSSI is determined to be greater than or equal to the first threshold). In step 374 the base station excludes from further consideration the fourth control channel when the average fourth control channel RSSI is not determined to be less than the first threshold (e.g., the average fourth control channel RSSI is determined to be greater than or equal to the first threshold). In step 376 the base station excludes from further consideration the fifth control channel when the average fifth control channel RSSI is not determined to be less than the first threshold (e.g., the average fifth control channel RSSI is determined to be greater than or equal to the first threshold). In step 378 the base station excludes from further consideration the sixth control channel when the average sixth control channel RSSI is not determined to be less than the first threshold (e.g., the average sixth control channel RSSI is determined to be greater than or equal to the first threshold).

In step 380 the base station excludes from further consideration the first control channel when at least one measured beam RSSI corresponding to the first control channel exceeds the second threshold. In step 382 the base station excludes from further consideration the second control channel when at least one measured beam RSSI corresponding to the second control channel exceeds the second threshold. In step 384 the base station excludes from further consideration the third control channel when at least one measured beam RSSI corresponding to the third control channel exceeds the second threshold. In step 386 the base station excludes from further consideration the fourth control channel when at least one measured beam RSSI corresponding to the fourth control channel exceeds the second threshold. In step 388 the base station excludes from further consideration the fifth control channel when at least one measured beam RSSI corresponding to the fifth control channel exceeds the second threshold. In step 390 the base station excludes from further consideration the sixth control channel when at least one measured beam RSSI corresponding to the sixth control channel exceeds the second threshold. Operation proceeds from step 364, via connecting node E 392, to step 394.

In step 394 the base station determines if the filtered set of control channels to be considered for selection, which is a remaining set of control channels after applying exclusion(s), is an empty set. If the determination of step 394 is that the filtered set of control channels is an empty set, then operation proceeds from step 394 to step 396, in which the base station triggers an interference alarm. Operation proceeds from step 396 to step 398 in which the base station switches to an override procedure, e.g., a manual override procedure. In some embodiments, the override procedure includes modifying one or more of the RSSI based exclusion criteria, e.g., changing one or both of the first threshold or the second threshold, e.g., changing the first threshold to a higher value and/or changing the second threshold to a higher value. In some embodiments, the override procedure includes eliminating one of the RSSI based exclusion criteria, e.g., eliminating excluding a channel based on an individual channel beam RSSI value being too high. Operation proceeds from step 398, connecting node H 399 to the input of step 283.

Returning to step 394, in step 394 if the filtered set of control channels includes one or more channels, then operation proceeds from step 394 to step 400. In step 400 the base station selects from the one or more channels, remaining under consideration for selection, a control channel to be used for communication of control signals. Step 400 includes steps 402, 404, 406 and 408. In step 402 the base station identifies a set of one or more control channels having a lowest average channel RSSI value from the control channels remaining under consideration for selection. Operation proceeds from step 402 to step 404.

In step 404 the base station determines if the set of one or more control channels having the lowest RSSI value includes a single control channel or multiple control channels. If the identified set of one or more channels having the lowest average RSSI value includes only a single control channel, then operation proceeds from step 404 to step 406, in which the base station selects the single control channel as the control channel to be used for communication of control signals. However, if the identified set of one or more channels having the lowest average RSSI value includes multiple control channels, then operation proceeds from step 404 to step 408. In step 408 the base station selects, from the identified set of multiple control channels having the lowest average RSSI value, a channel to be used for communications of control signals, said selection being in accordance with a predetermined selection scheme, e.g., based on known or anticipated expected relative interference levels. In some embodiments, step 408 includes step 410, in which the base station selects, from the identified set of multiple control channels having a lowest average RSSI value, a lowest numbered channel, e.g., lowest frequency channel, as the control channel to be used for communications of control signals. Operation proceeds from step 400, via connecting node F 412, to steps 414 and 416.

In step 414, the base station transmits, using a control channel antenna beam, control information on the control channel selected to be used. The control information includes, e.g., synchronization signal block (SSB) information. In step 416, the base station transmits traffic data using a traffic channel antenna beam which is narrower than the control channel antenna beam used to transmit control information. In some embodiments, the rest of the channels, which were not selected to be the control channel, can be, and sometimes are, used by the base station to transmit traffic, e.g., with carrier aggregation, and the high directivity for the narrow traffic beams makes them less susceptible to interference in comparison to wide control beams. Steps 414 and 416 are repeated multiple times, e.g., on an ongoing basis, in accordance with an implementing timing and frequency structure.

In various embodiments, different successive iterations of step 414 correspond to different control channel antenna beams, e.g., a first beam of selected control channel, a second beam of the selected control channel, a third beam of selected control channel, a fourth beam of the selected control channel, a first beam of the selected control channel, . . . , etc.

Operation proceeds from steps 414 and 416 to step 418. In step 418 the base station determines if a predetermined time as expired since a control channel selection and/or if a convenient time has occurred, e.g., a low activity period has occurred, for restarting the measurement process for measuring RSSI corresponding to potential control channels and selecting a new control channel. If the determination is that the predetermined time has occurred signal the last control channel selection or if it has been determined that it is a convenient time to start another control channel selection process, then operation proceeds from step 418 to step 420, in which the base station restarts the measurement process. Operation proceeds from step 420, via connecting node G 422 to the input of step 404.

In some embodiments, higher numbered (e.g., higher frequency) control channels are closer in frequency to a known band (e.g., 37.6 to 4 GHz band) which is used by devices (e.g., terrestrial base stations) which generate interference than lower numbered (lower frequency) control channels (e.g., which are closer to a known band which is used by devices, e.g., satellites, which are not expected to generate a high level of interference). In such an embodiment, it is desirable to select the lowered number channel in the case of a tie condition, e.g., same average RSSI for two remaining channels, under consideration.

In some embodiments, control channel beams are transmitted using a set of beams (e.g. 4 beams), each beam in the set of beams has a beam width which is a fraction (e.g. ¼) in terms of width of the area covered by the set of beams corresponding to a control channel (e.g., there are 4 different beams used to cover the composite beam area corresponding to a single control channel in some embodiments). For example, a control channel corresponds to a selected 100 MHz bandwidth, corresponds to a sector base station coverage angle of 120 degrees, corresponds to a set of four beams with each beam corresponding to a 30 degree angle.

One exemplary embodiment in which the method of flowchart 200 of FIG. 2 is implemented will now be described. There is 600 MHz of shared bandwidth of interest in the frequency range of 37.0-37.6 GHz. There are six alternative candidate control channels (CH1-CH6) from which a control channel to be used for communication of control signal is to be selected by the base station implementing the exemplary method. Each candidate control channel is a non-overlapping 100 MHz channel within the 600 MHz of shared bandwidth. There are 4 control channel beams (beam 1, beam 2, beam 3 and beam 4). The base station sweeps between the 4 control channel beams in accordance with different time slots being associated with different beams, e.g., a time-multiplexed approach. For example, the base station corresponds to a sector base station with 120 degrees total coverage and each beam corresponds to 30 degrees. The control channel beams are wider than data channel beams. In some embodiments, a data channel beam is, e.g., 6 or 7 degrees wide. In some embodiments a data channel beam is 1 degree wide.

Other embodiments may have different characteristics, e.g., a different amount of shared spectrum, a different frequency range in which the shared spectrum is located, a different width of a candidate channel, a different number of candidate channels, a different number of control channel beams.

Figure 3:
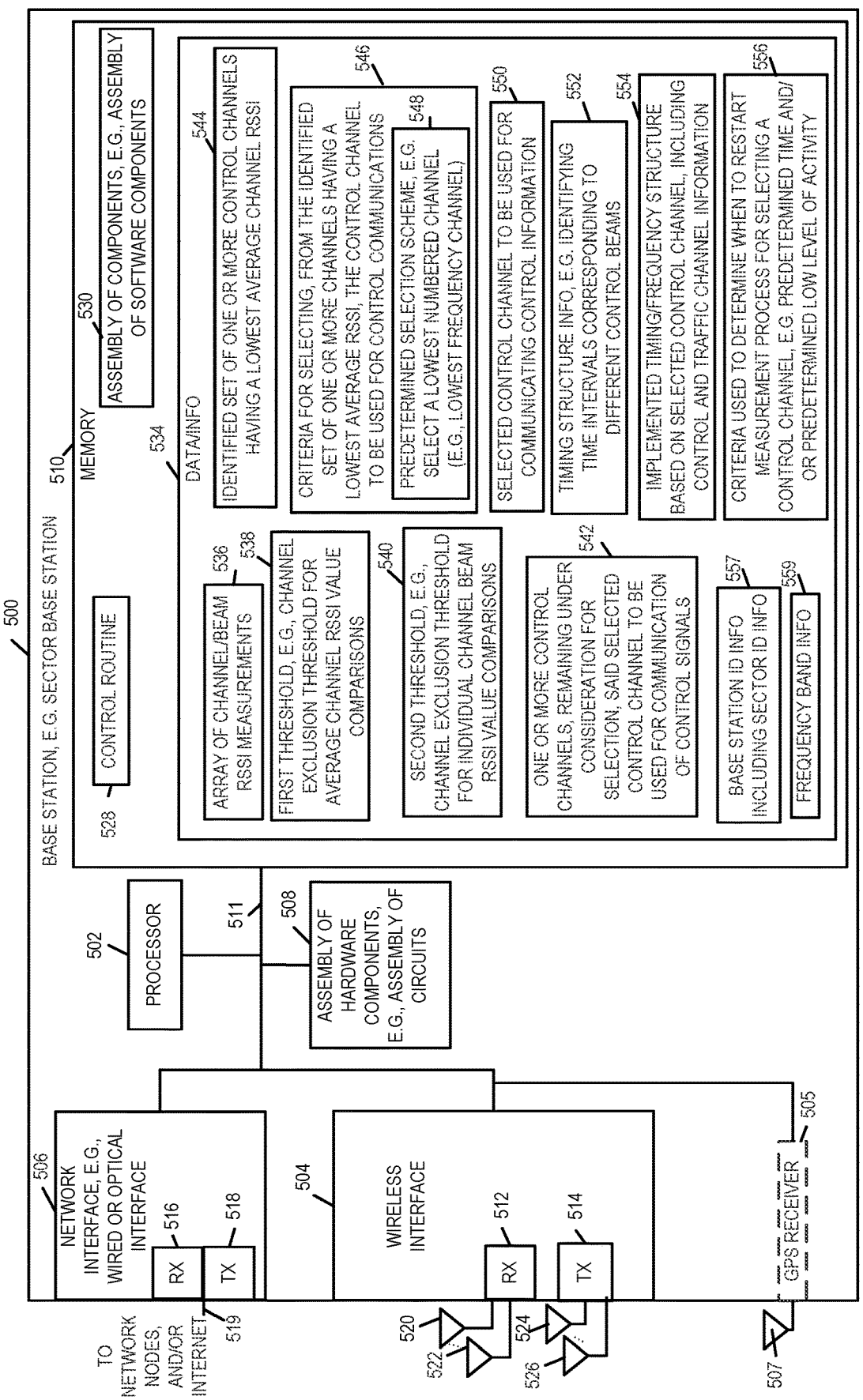
FIG. 3 is a drawing of an exemplary base station in accordance with an exemplary embodiment.

FIG. 3 is a drawing of an exemplary base station 500, e.g., a sector base station, in accordance with an exemplary embodiment. Exemplary base station 500 is, e.g., any of the base stations 102, 104, 106, 108, 110, 112 of system 100 of FIG. 1 and/or a base station implementing the method of flowchart 200 of FIG. 2. Exemplary base station 500 includes a processor 502, e.g., a CPU, a wireless interface 504, a network interface 506, an assembly of hardware components 508, e.g., an assembly of circuits, and memory 510 coupled together via a bus 511 over which the various elements may interchange data and information. In some embodiments, base station 500 further includes a GPS receiver 505 coupled to bus 511.

Wireless interface 504 includes a wireless receiver 512 and wireless transmitter 515. Wireless receiver 512 is coupled to a plurality of receive antennas or antenna elements (520, ..., 522) via which the base station 500 may receive signals. Wireless transmitter 514 is coupled to a plurality of transmit antennas or antenna elements (524, ..., 526) via which the base station may transmit signals. In some embodiments, the same antennas or antennas elements are used of receive and transmit. Exemplary base station 500 supports beamforming. In various embodiments control channels beams are wider than data channel beams.

Wireless network 506, e.g., a wired or optical interface, includes a network receiver 516 and a network transmitter 518. The receiver 516 and transmitter 518 are coupled to connector 516, via which the base station 500 is coupled to other network nodes, e.g., other base stations, core network nodes, routers, etc. and/or the Internet. GPS receiver 405 is coupled to GPS antenna 507, via which the base station 500 receives GPS signals from GPS satellites, said GPS signals used by the receiver 405 to determine time, position, and altitude information.

Memory 510 includes a control routine 528, an assembly of components 530, e.g., an assembly of software components, and data/information 534. Data/information 534 includes an array of channel/beam RSSI measurements 536, a first threshold 538, e.g., a channel exclusion threshold for average channel RSSI value comparisons, a second threshold 540, e.g., a channel exclusion threshold for individual channel beam RSSI value comparisons, information 542 indicating or identifying a set of one or more control channels, remaining under consideration for selection (after exclusions are applied), said selected control channel to be used for communication of control signals, an identified set 544 of one or more control channels having a lowest average channel RSSI, criteria 546 for selecting, from the identified set of one or more control channels having a lowest average RSSI, the control channel to be used for control communications. Criteria 546 includes a predetermined selection scheme 548 to be implemented, e.g., select a lowest numbered channel (e.g., corresponding to a lowest frequency channel). Data/information 534 further includes information 550 indicating a selected control channel to be used for communicating control information, timing structure information 552, e.g., identifying time intervals corresponding to different control beams, information 554 indicating or defining an implemented timing/frequency structure based on the selected control channel, said implemented timing/frequency structure information including control and traffic channel information. Data/information 534 further includes criteria 556 to be used to determine when to restart a measurement process for selecting a control channel, e.g., a predetermined time interval and/or a predetermined detected low level of activity. Data/information 534 further includes base station ID information 557 including base station sector ID information and frequency band information 559, e.g., identifying frequency band(s) which may be used by the base station 500.

Figure 4A:
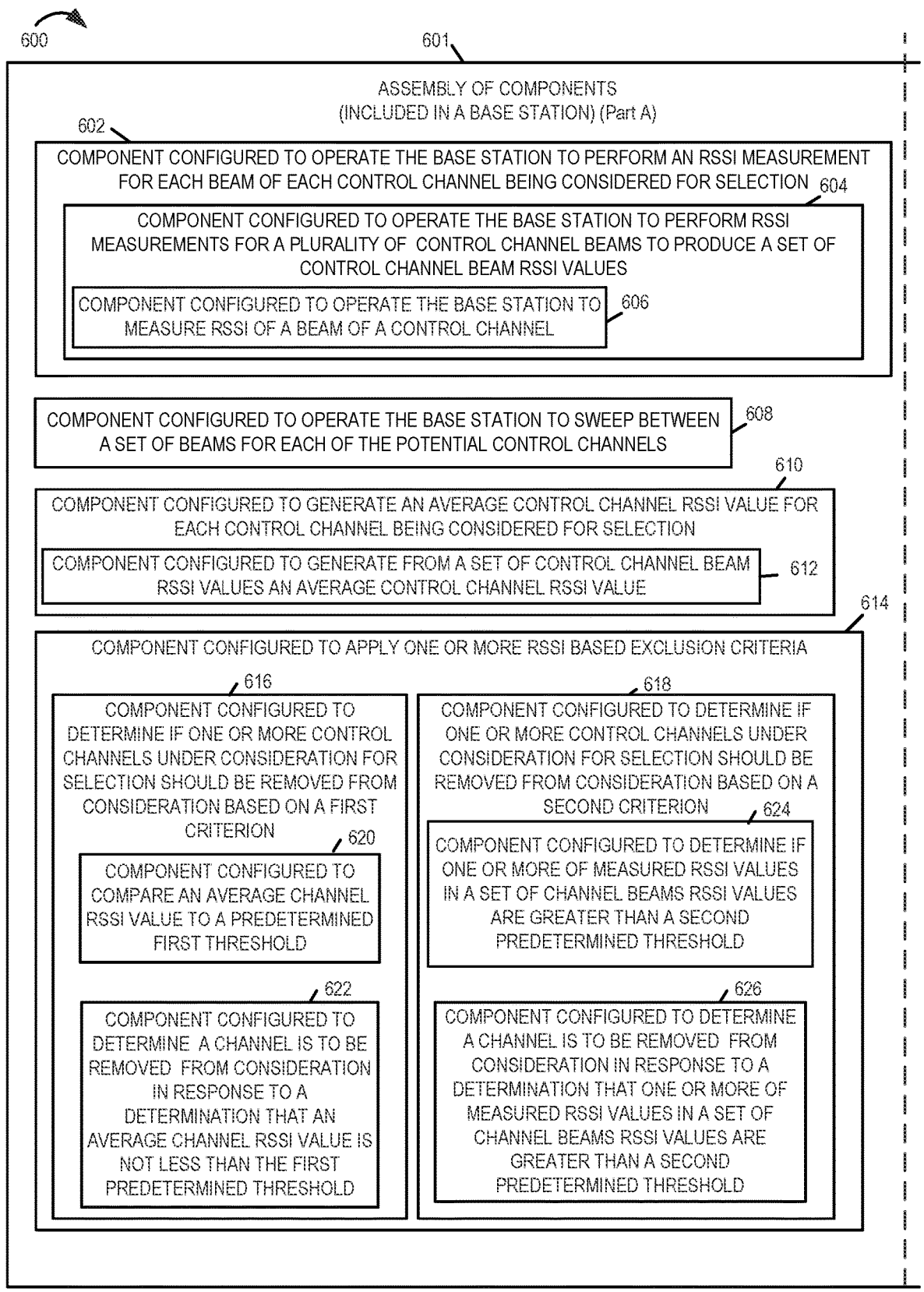
FIG. 4A is a first part of an assembly of components which may be included in an exemplary base station, in accordance with an exemplary embodiment.
Figure 4B:
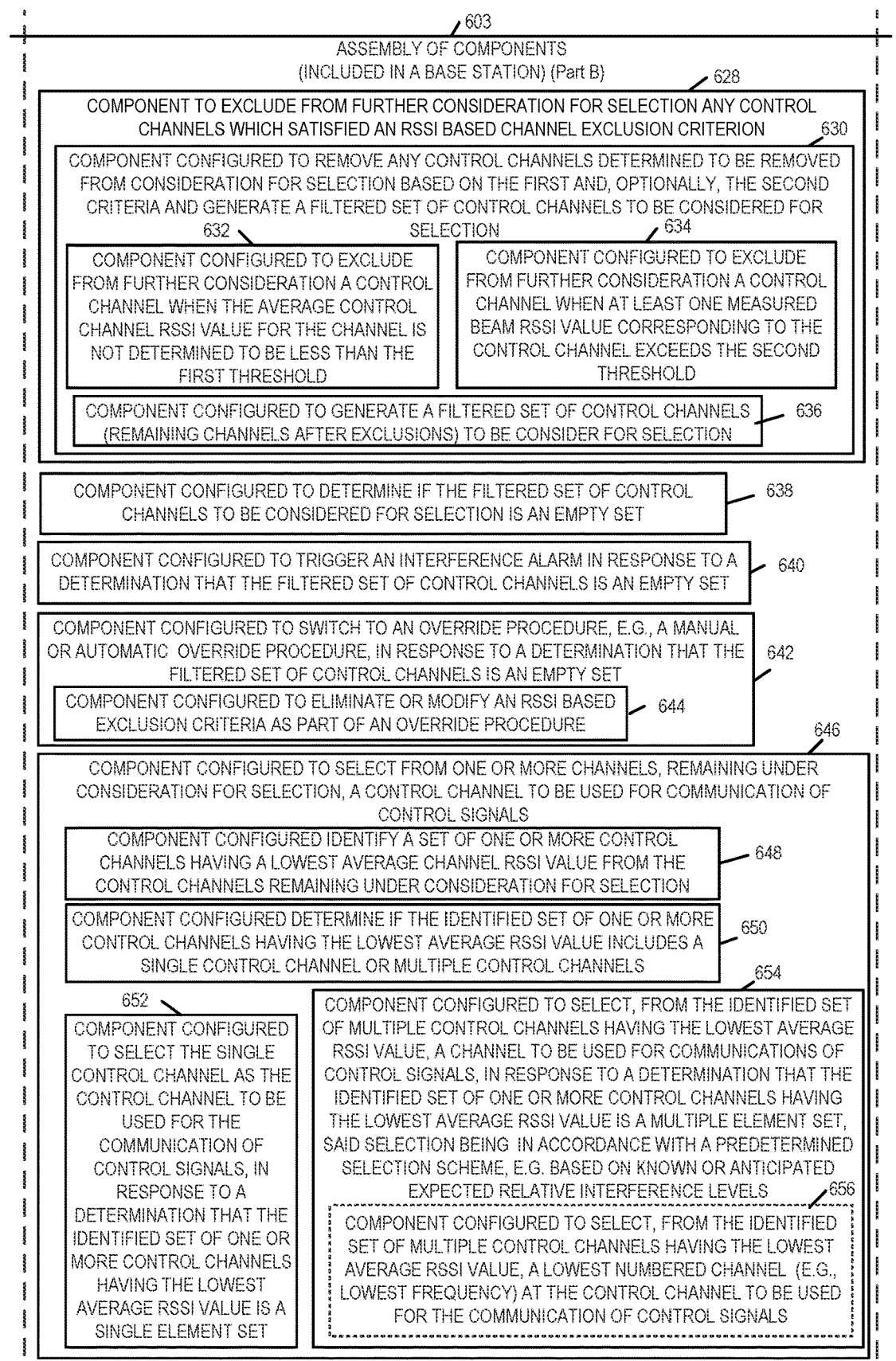
FIG. 4B is a second part of an assembly of components which may be included in an exemplary base station, in accordance with an exemplary embodiment.
Figures 4, 4C:
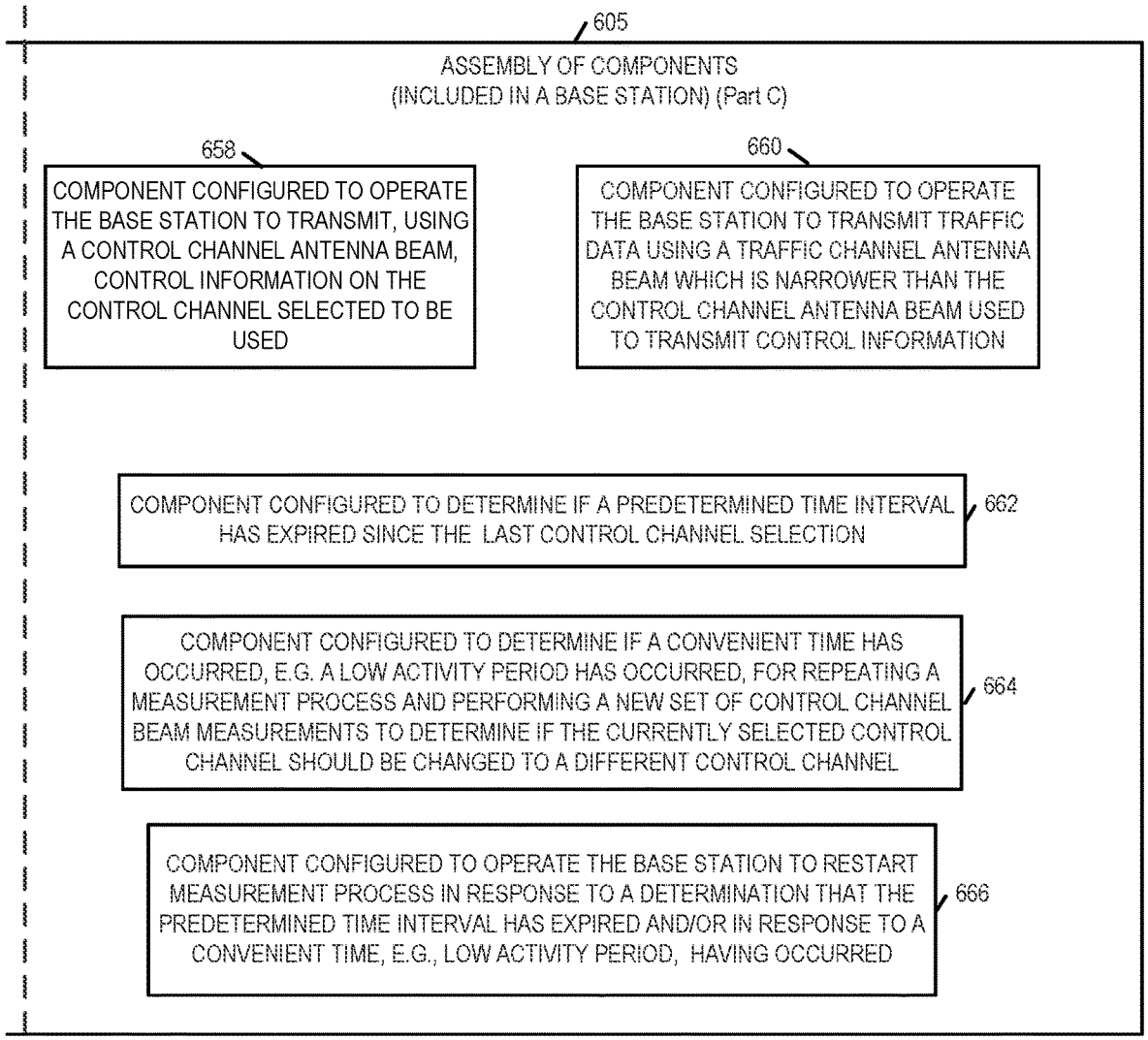
FIG. 4C is a third part of an assembly of components which may be included in an exemplary base station, in accordance with an exemplary embodiment.
FIG. 4 comprises the combination of FIG. 4A, FIG. 4B and FIG. 4C.

FIG. 4, comprising the combination of FIG. 4A, FIG. 4B and FIG. 4, is a drawing of an exemplary assembly of components 600, comprising the combination of Part A 601, Part B 603 and Part C 605, which may be included in an exemplary base station in accordance with an exemplary embodiment. Assembly of components 600 is, e.g., included any of base stations 102, 104, 106, 108, 110, 112 of system 100 of FIG. 1, a base station implementing the method of flowchart 200 of FIG. 2 and/or base station 500 of FIG. 3.

The components in the assembly of components 600 can, and in some embodiments are, implemented fully in hardware within a processor, e.g., processor 502, e.g., as individual circuits. The components in the assembly of components 600 can, and in some embodiments are, implemented fully in hardware within the assembly of hardware components 608, e.g., as individual circuits corresponding to the different components. In other embodiments some of the components are implemented, e.g., as circuits, within processor 502 with other components being implemented, e.g., as circuits within assembly of components 508, external to and coupled to the processor 502. As should be appreciated the level of integration of components on the processor and/or with some components being external to the processor may be one of design choice. Alternatively, rather than being implemented as circuits, all or some of the components may be implemented in software and stored in the memory 510 of the base station 500, with the components controlling operation of base station 500 to implement the functions corresponding to the components when the components are executed by a processor e.g., processor 502. In some such embodiments, the assembly of components 600 is included in the memory 510 as part of an assembly of software components 530. In still other embodiments, various components in assembly of components 600 are implemented as a combination of hardware and software, e.g., with another circuit external to the processor providing input to the processor which then under software control operates to perform a portion of a component's function.

When implemented in software the components include code, which when executed by a processor, e.g., processor 502, configure the processor to implement the function corresponding to the component. In embodiments where the assembly of components 600 is stored in the memory 510, the memory 510 is a computer program product comprising a computer readable medium comprising code, e.g., individual code for each component, for causing at least one computer, e.g., processor 502, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 6 control and/or configure the base station 500 or elements therein such as the processor 502, to perform the functions of corresponding steps illustrated and/or described in the method of one or more of the flowcharts, signaling diagrams and/or described with respect to any of the Figures. Thus, the assembly of components 600 includes various components that perform functions of corresponding one or more described and/or illustrated steps of an exemplary method, e.g., steps of the method of flowchart 200 of FIG. 2.

Assembly of components 600 includes a component 602 configured to operate the bae station to perform an RSSI measurement for each beam of each control channel being considered for selection. Component 602 includes a component 604 configured to operate the base station to perform RSSI measurement for a plurality of control channels beams to produce a set of control channels channel beam RSSI values. Component 604 includes a component 606 configured to operate the base station to measure RSSI of a beam of a control channel. In one exemplary embodiment, component 606 controls a base station to implement steps 208, 210, 212, 214, 218, 220, 222, 224, 228, 230, 232, 234,238, 240, 242, 244, 248, 250, 252, 254, 258, 260, 262 and 264 of the method of flowchart 200 of FIG. 2. In one exemplary embodiment, component 604 controls a base station to implement steps 206, 216, 226, 236, 246 and 256 of the method of flowchart 200 of FIG. 2.

Assembly of components 600 further includes a component 608 configured to operate the base station to sweep between a set of beams, e.g., 4 control channel beams, for each of the potential control channels, e.g., 6 100 MHz channels. Assembly of components 600 further includes a component 610 configured to generate an average control channel RSSI for each control channel being considered for selection. Component 610 includes a component 612 configured to generate, from a set of control channels bean RSSI values, an average control channel RSSI. In one exemplary embodiment, component 610 controls a base station to implement steps of the method of flowchart 200 of FIG. 2. In one exemplary embodiment, component 612 controls a base station to implement steps 270, 272, 274, 276, 278 and 280 of the method of flowchart 200 of FIG. 2.

Assembly of components 600 further includes a component 614 configured to apply one or more RSSI based exclusion criteria. Component 614 includes a component 616 configured to determine if one or more control channels under consideration for selection should be removed from consideration based on a first criterion and a component 618 configured to determine if one or more control channels under consideration for selection should be removed from consideration based on a second criterion.

Component 616 includes a component 620 configured to compare an average channel RSSI value to a predetermined threshold and a component 622 configured to determine that a channel is to be removed from consideration in response to a determination that an average channel RSSI value is not less than the first predetermined threshold. In one exemplary embodiment, component 620 controls a base station to implement steps 286, 292, 298, 304, 310 and 310 of the method of flowchart 200 of FIG. 2. In one exemplary embodiment, component 622 controls a base station to implement steps 290, 296, 302, 308, 314 and 320 of the method of flowchart 200 of FIG. 2.

Component 618 includes a component 624 configured to determine if one or more of the measured RSSI values in a set of channel beam RSSI values are greater than a second predetermined threshold and a component 626 configured to determine that a channel is to be removed from consideration in response to a determination that one or more of measured RSSI values in a set of channel beam RSI values are greater than a second predetermined threshold. In one exemplary embodiment, component 624 controls a base station to implement steps 326, 332, 338, 344, 350 and 356 of the method of flowchart 200 of FIG. 2. In one exemplary embodiment, component 626 controls a base station to implement steps 330, 336, 342, 348, 344 and 360 of the method of flowchart 200 of FIG. 2.

Assembly of components 600 further includes a component 628 configured to exclude from further consideration for selection any control channels which satisfied an RSSI based channel exclusion criterion. Component 628 includes a component 630 configured to remove any control channels determined to be removed from consideration for selection based on the first, and optionally, second criteria, and generate a filtered set of control channels (remaining set of control channels after exclusion) to be considered for selection. Component 630 includes a component 632 configured to exclude from further consideration a control channel when the average control channel RSSI value for the channel is not determined to be less than the first threshold (e.g., average control channel RSSI value is greater than or equal to the first predetermined threshold, e.g., indicating an unacceptably high level of interference), a component 644 configured to exclude from further consideration a control channel when at least one measured beam RSSI value corresponding to the control channel exceeds the second threshold, e.g. indicating an unacceptably high level of interference for at least one beam of the channel. In one exemplary embodiment, component 632 controls a base station to implement steps 368, 370, 372, 374, 376 and 378 of the method of flowchart 200 of FIG. 2. In one exemplary embodiment, component 634 controls a base station to implement steps 380, 382, 384, 386, 388 and 390 of the method of flowchart 200 of FIG. 2. Component 630 further includes a component 636 configured to generate a filtered set of control channels (remaining channels after exclusions) to be considered for selection.

Assembly of components 600 further includes a component 638 configured to determine if the filtered set of control channel to be considered for selection is an empty set, a component 640 configured to trigger an interference alarm in response to a determination that the filtered set of control channels is an empty set, and a component 642 configured to switch to an override procedure, e.g. a manual or automatic override procedure, in response to a determination that the filtered set of control channels is an empty set. Component 642 includes a component 644 configured to eliminate or modify an RSSI based exclusion criteria as part of an override procedure. For example, exclusions based on an individual beam RSSI value of a channel are eliminated, or the second threshold is changed, e.g., increased by a predetermined step amount to reduce the likelihood of exclusions, or the first threshold is changed, e.g., increased by a predetermined step amount to reduce the likelihood of exclusions.

Assembly of components 600 further includes a component 646 configured to select from one or more channels, remaining under consideration for selection, a control channel to used for communication of control signals. Component 646 includes a component 648 configured to identify a set of one or more control channels having a lowest average RSSI value from the control channels remaining under consideration for selection and a component 650 configured to determine if the identified set of one or more control channels having the lowest average RSSI value includes a single control channel or multiple control channels. Component 646 further includes a component 652 configured to select the single control channel as the control channel to be used for communication of control signals, in response to a determination that the identified set of one or more control channels having the lowest average RSSI value is single element set. Component 646 further includes a component 654 configured to select, from the identified set of one or more control channels having the lowest average RSSI value (which is an identified set of multiple control channels having the lowest average RSSI value), a control channel to be used for communications of control signals, in response to a determination that the identified set of one or more channels having the lowest average RSSI value is a multiple element set, said selection being in accordance with a predetermined selection scheme, e.g. based on known or anticipated expected relative interference levels. In some embodiments, component 654 includes a component 656 configured to select, from the identified set of multiple control channels having the lowest average RSSI value, a lowest numbered channel (e.g. lowest frequency channel) as the control channel to be used for the communication of control signals.

Assembly of components 600 further includes a component 658 configured to operate the base station to transmit, using a control channel antenna beam, control information on the control channel selected to be used, and a component 660 configured to operate the base station to transmit traffic data using a traffic channel antenna beam which is narrower than the control channel antenna beam used to transmit control channel information.

Assembly of components 600 further includes a component 662 configured to determine if a predetermined time interval has expired since the last control channel selection by the base station, a component 664 configured to determine if a convenient time has occurred, e.g. a low activity period has occurred, for repeating a measurement process and performing a new set of control channel beam measurement to determine if the currently selected control channel should be changed to a different control channel, and a component 666 configured to operate the base station to restart the measurement process in response to a determination that a predetermined time interval has expired and/or in response to a convenient time, e.g. low activity period, having occurred.

Figure 5:
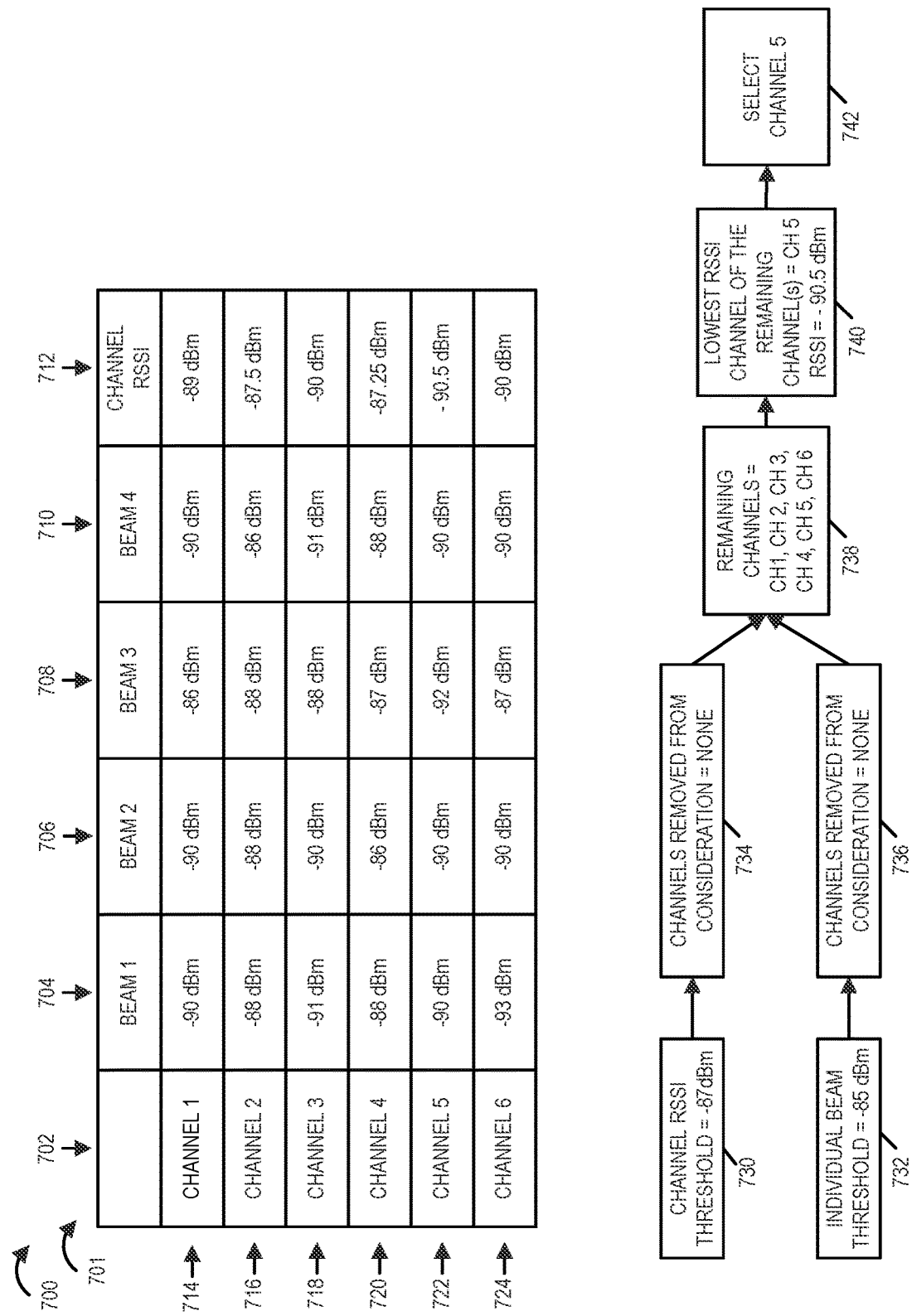
FIG. 5 illustrates a first example in which a base station, e.g., a sector base station supporting beamforming, selects a control channel to be used for communications of control signals in accordance with an exemplary.

FIG. 5 is a drawing 700 which illustrates a first example in which a base station, e.g., a sector base station supporting beamforming, selects a control channel to be used for communications of control signals in accordance with an exemplary. Drawing 700 includes table 701 which includes exemplary RSSI measurement information corresponding to each channel beam combination and a determined average RSSI information for each channel. Table 701 includes a set of measurements, wherein each of the different measurements corresponds to a different combination of channel and beam. Channel 1, channel 2, channel 3, channel 4, channel 5 and channel 6 are, e.g., different adjacent 100 MHz bands of spectrum. The different beams are, e.g., four different directional beams, e.g., as shown in FIG. 9. In some embodiments, the 4 different beams correspond to a sector comprising a 120 degree directional coverage range, e.g. with each beam corresponding to 30 degrees. Table 701 also includes an average channel RSSI value for each channel, which is determined by averaging the four beam measurement values corresponding to the channel. First column 702 includes channel identification information. Second column 704 includes beam 1 RSSI measurement information. Third column 706 includes beam 2 RSSI measurement information. Fourth column 708 includes beam 3 RSSI measurement information. Fifth column 710 includes beam 4 RSSI measurement information. Sixth column 712 includes an average channel RSSI for each channel. Row 714 includes channel 1 RSSI information including a RSSI measurement for each beam of the channel 1 and an average RSSI value for channel 1. Row 716 includes channel 2 RSSI information including a RSSI measurement for each beam of the channel 2 and an average RSSI value for channel 2. Row 718 includes channel 3 RSSI information including a RSSI measurement for each beam of the channel 3 and an average RSSI value for channel 3. Row 720 includes channel 4 RSSI information including a RSSI measurement for each beam of the channel 4 and an average RSSI value for channel 4. Row 722 includes channel 5 RSSI information including a RSSI measurement for each beam of the channel 5 and an average RSSI value for channel 5. Row 724 includes channel 6 RSSI information including a RSSI measurement for each beam of the channel 6 and an average RSSI value for channel 6.

Box 730 indicates that a channel RSSI exclusion threshold=−87 dBm is applied for the example of FIG. 5. The RSSI channel exclusion threshold is applied to each of the channel average RSSI values of column 712. In this example, each of the channel average RSSI values are less than the channel RSSI exclusion threshold of −87 dBm; therefore, none of the channels are removed from consideration for selection to be used to communicate control signals, as indicated by box 734.

Box 732 indicates that an individual beam RSSI exclusion threshold=−85 dBm is applied for the example of FIG. 5. The individual beam RSSI exclusion threshold is applied to each of the RSSI measurement values in columns 704, 706, 708, and 710. If one or more beam RSSI measurement values, corresponding to a channel exceeds the individual beam RSSI exclusion threshold, then that channel is excluded from further consideration to be selected to be used to communicate control signals. In this example, each of the individual beam RSSI values are less than the individual beam RSSI exclusion threshold of −85 dBm; therefore, none of the channels are removed from consideration for selection to be used to communication control signals, as indicated by box 736.

The determination from the exclusion criteria applications is implemented, and the remaining channels, are the full set of channels={channel 1, channel 2, channel 3, channel 4, channel 5, channel 6}, as indicated by box 738. A set of one or more channels, which have the lowest average RSSI, is identified from the remaining set of channels. In this example the set of channel(s) with the lowest average RSSI={channel 5), which has an RSSI=−90.5 dBm, as indicated by box 740. Therefore channel 5 is selected as the channel to be used to communicate control information, as indicated by box 742.

Figure 6:
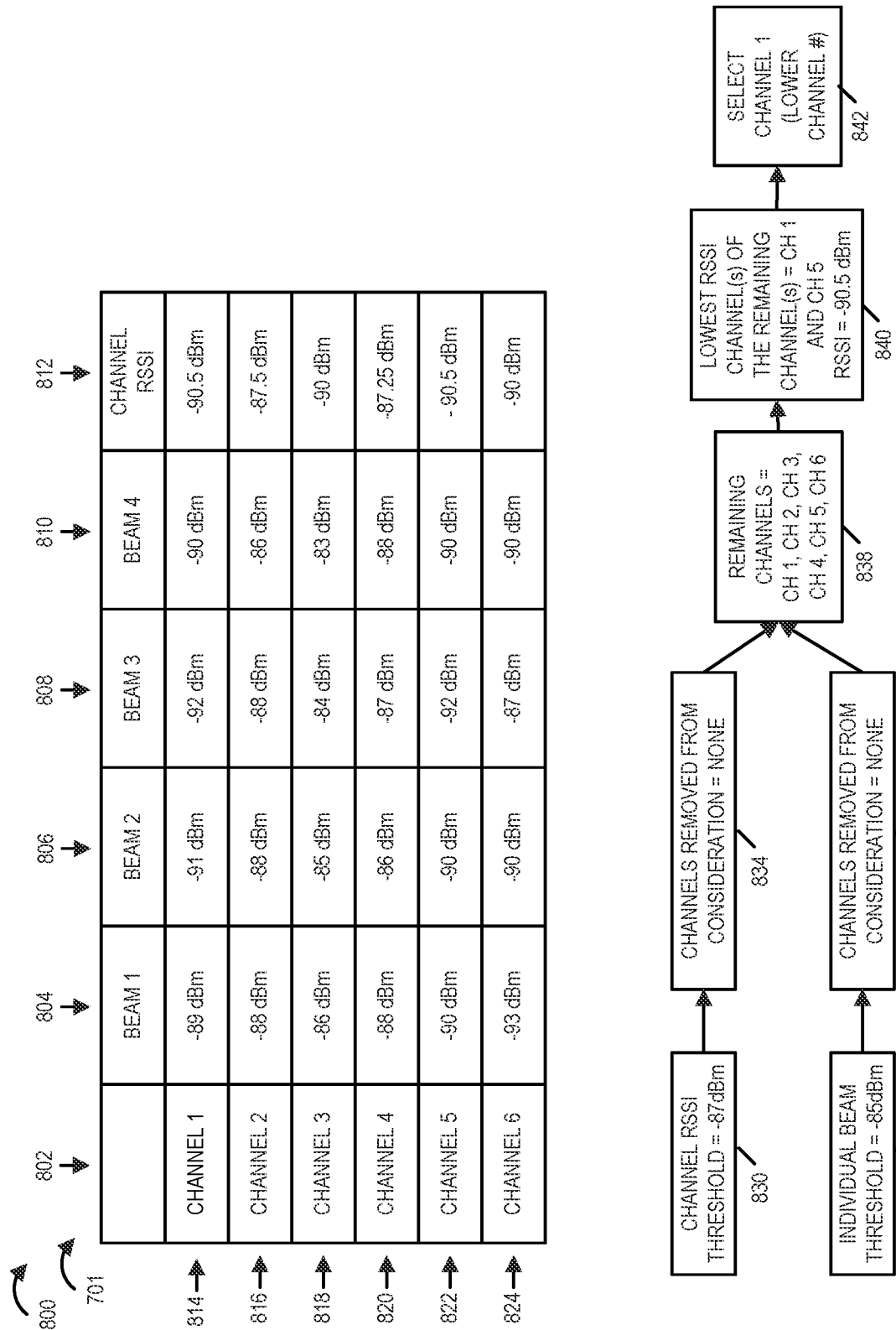
FIG. 6 illustrates a second example in which a base station, e.g., a sector base station supporting beamforming, selects a control channel to be used for communications of control signals in accordance with an exemplary.

FIG. 6 is a drawing 800 which illustrates a second example in which a base station, e.g., a sector base station supporting beamforming, selects a control channel to be used for communications of control signals in accordance with an exemplary. Drawing 800 includes table 801 which includes exemplary RSSI measurement information corresponding to each channel beam combination and a determined average RSSI information for each channel. Table 801 includes a set of measurements, wherein each of the different measurements corresponds to a different combination of channel and beam. Channel 1, channel 2, channel 3, channel 4, channel 5 and channel 6 are, e.g., different adjacent 100 MHz bands of spectrum. The different beams are, e.g., four different directional beams, e.g., as shown in FIG. 9. In some embodiments, the 4 different beams correspond to a sector comprising a 120 degree directional coverage range, e.g. with each beam corresponding to 30 degrees. Table 801 also includes an average channel RSSI value for each channel, which is determined by averaging the four beam measurement values corresponding to the channel. First column 802 includes channel identification information. Second column 804 includes beam 1 RSSI measurement information. Third column 806 includes beam 2 RSSI measurement information. Fourth column 808 includes beam 3 RSSI measurement information. Fifth column 810 includes beam 4 RSSI measurement information. Sixth column 812 includes an average channel RSSI for each channel. Row 814 includes channel 1 RSSI information including a RSSI measurement for each beam of the channel 1 and an average RSSI value for channel 1. Row 816 includes channel 2 RSSI information including a RSSI measurement for each beam of the channel 2 and an average RSSI value for channel 2. Row 818 includes channel 3 RSSI information including a RSSI measurement for each beam of the channel 3 and an average RSSI value for channel 3. Row 820 includes channel 4 RSSI information including a RSSI measurement for each beam of the channel 4 and an average RSSI value for channel 4. Row 822 includes channel 5 RSSI information including a RSSI measurement for each beam of the channel 5 and an average RSSI value for channel 5. Row 824 includes channel 6 RSSI information including a RSSI measurement for each beam of the channel 6 and an average RSSI value for channel 6.

Box 830 indicates that a channel RSSI exclusion threshold=−87 dBm is applied for the example of FIG. 6. The RSSI channel exclusion threshold is applied to each of the channel average RSSI values of column 812. In this example, each of the channel average RSSI values are less than the channel RSSI exclusion threshold of −87 dBm; therefore, none of the channels are removed from consideration for selection to be used to communicate control signals, as indicated by box 834.

Box 832 indicates that an individual beam RSSI exclusion threshold=−85 dBm is applied for the example of FIG. 6. The individual beam RSSI exclusion threshold is applied to each of the RSSI measurement values in columns 804, 806, 808, and 810. If one or more beam RSSI measurement values, corresponding to a channel exceeds the individual beam RSSI exclusion threshold, then that channel is excluded from further consideration to be selected to be used to communicate control signals. In this example, each of the individual beam RSSI values are less than the individual beam RSSI exclusion threshold of −85 dBm; therefore, none of the channels are removed from consideration for selection to be used to communication control signals, as indicated by box 836.

The determinations of the exclusion criteria evaluations are implemented, and the remaining channels, are the full set of channels={channel 1, channel 2, channel 3, channel 4, channel 5, channel 6}, as indicated by box 838. A set of one or more channels, which have the lowest average RSSI, is identified from the remaining set of channels. In this example the set of channel(s) with the lowest average RSSI={channel 1, channel 5), which each have the same RSSI=−90.5 dBm, as indicated by box 840. Since multiple channels have the lowest average channel RSSI, a selection among the multiple channels is made in accordance with a predetermined rule. In this example, the predetermined rule is to select the channel with the lowest channel number. In this exemplary embodiment, the lower the channel number, the lower the frequency, and the lower the frequency, the lower the expected interference from other devices, e.g., other interfering terrestrial base stations, operating outside the range but adjacent to the control channel spectrum. Therefore channel 1, which is the lower number channel, is selected as the channel to be used to communicate control information, as indicated by box 842.

Figure 7:
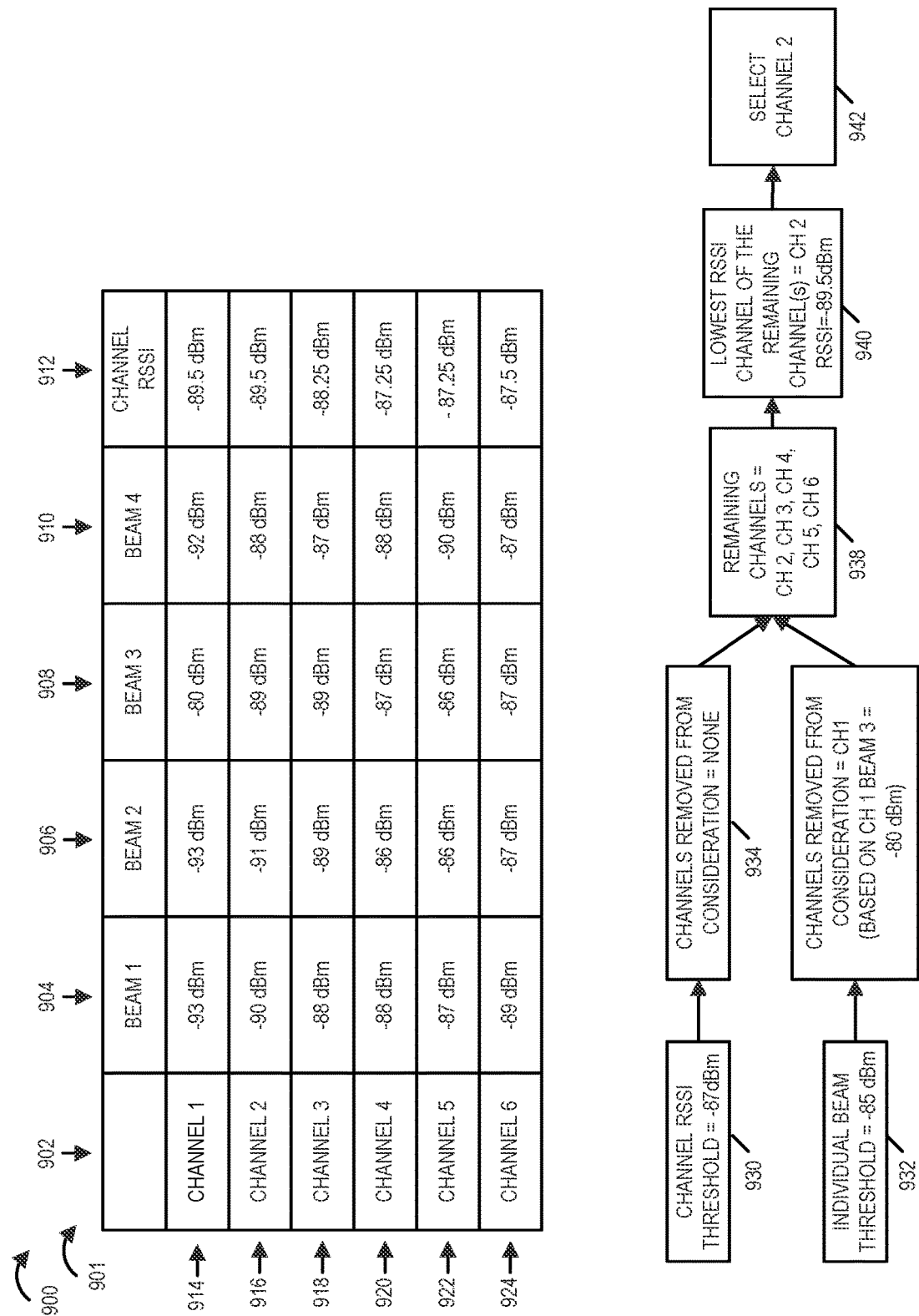
FIG. 7 illustrates a third example in which a base station, e.g., a sector base station supporting beamforming, selects a control channel to be used for communications of control signals in accordance with an exemplary.

FIG. 7 is a drawing 900 which illustrates a third example in which a base station, e.g., a sector base station supporting beamforming, selects a control channel to be used for communications of control signals in accordance with an exemplary. Drawing 900 includes table 901 which includes exemplary RSSI measurement information corresponding to each channel beam combination and a determined average RSSI information for each channel. Table 901 includes a set of measurements, wherein each of the different measurements corresponds to a different combination of channel and beam. Channel 1, channel 2, channel 3, channel 4, channel 5 and channel 6 are, e.g., different adjacent 100 MHz bands of spectrum. The different beams are, e.g., four different directional beams, e.g., as shown in FIG. 9. In some embodiments, the 4 different beams correspond to a sector comprising a 120 degree directional coverage range, e.g. with each beam corresponding to 30 degrees. Table 901 also includes an average channel RSSI value for each channel, which is determined by averaging the four beam measurement values corresponding to the channel. First column 902 includes channel identification information. Second column 904 includes beam 1 RSSI measurement information. Third column 906 includes beam 2 RSSI measurement information. Fourth column 908 includes beam 3 RSSI measurement information. Fifth column 910 includes beam 4 RSSI measurement information. Sixth column 912 includes an average channel RSSI for each channel. Row 914 includes channel 1 RSSI information including a RSSI measurement for each beam of the channel 1 and an average RSSI value for channel 1. Row 9916 includes channel 2 RSSI information including a RSSI measurement for each beam of the channel 2 and an average RSSI value for channel 2. Row 918 includes channel 3 RSSI information including a RSSI measurement for each beam of the channel 3 and an average RSSI value for channel 3. Row 920 includes channel 4 RSSI information including a RSSI measurement for each beam of the channel 4 and an average RSSI value for channel 4. Row 922 includes channel 5 RSSI information including a RSSI measurement for each beam of the channel 5 and an average RSSI value for channel 5. Row 924 includes channel 6 RSSI information including a RSSI measurement for each beam of the channel 6 and an average RSSI value for channel 6.

Box 930 indicates that a channel RSSI exclusion threshold=−87 dBm is applied for the example of FIG. 7. The RSSI channel exclusion threshold is applied to each of the channel average RSSI values of column 912. In this example, each of the channel average RSSI values are less than the channel RSSI exclusion threshold of −87 dBm; therefore, none of the channels are removed from consideration for selection to be used to communicate control signals, as indicated by box 934.

Box 932 indicates that an individual beam RSSI exclusion threshold=−85 dBm is applied for the example of FIG. 7. The individual beam RSSI exclusion threshold is applied to each of the RSSI measurement values in columns 904, 906, 908, and 910. If one or more beam RSSI measurement values, corresponding to a channel exceeds the individual beam RSSI exclusion threshold, then that channel is excluded from further consideration to be selected to be used to communicate control signals. In this example, the channel 1 beam 3 RSSI measurement value=−80 dBm, which is greater than the individual beam RSSI exclusion threshold of −85 dBm; therefore, channel 1 is removed from further consideration for selection to be used to communication control signals, as indicated by box 936.

The determinations of the exclusion criteria evaluations are implemented, and the remaining channels to be further considered for selection, are the set of channels={channel 2, channel 3, channel 4, channel 5, channel 6}, as indicated by box 938. A set of one or more channels, which have the lowest average RSSI, is identified from the remaining set of channels. In this example the set of channel(s) with the lowest average RSSI={channel 2}, which has an RSSI=−89.5 dBm, as indicated by box 940. Therefore channel 2 is selected as the channel to be used to communicate control information, as indicated by box 942.

Figure 8:
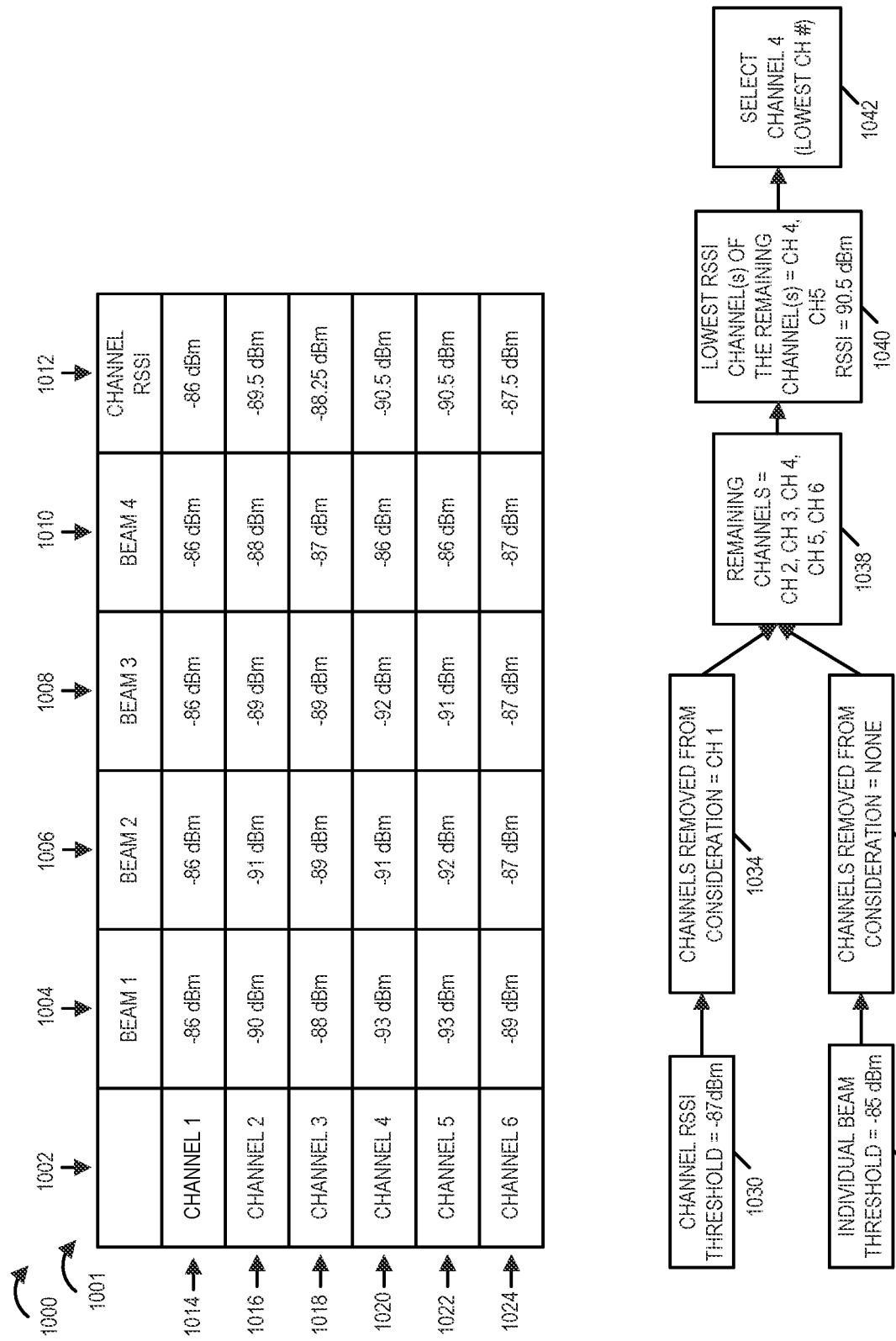
FIG. 8 illustrates a fourth example in which a base station, e.g., a sector base station supporting beamforming, selects a control channel to be used for communications of control signals in accordance with an exemplary.

FIG. 8 is a drawing 1000 which illustrates a fourth example in which a base station, e.g., a sector base station supporting beamforming, selects a control channel to be used for communications of control signals in accordance with an exemplary. Drawing 1000 includes table 1001 which includes exemplary RSSI measurement information corresponding to each channel beam combination and a determined average RSSI information for each channel. Table 1001 includes a set of measurements, wherein each of the different measurements corresponds to a different combination of channel and beam. Channel 1, channel 2, channel 3, channel 4, channel 5 and channel 6 are, e.g., different adjacent 100 MHz bands of spectrum. The different beams are, e.g., four different directional beams, e.g., as shown in FIG. 9. In some embodiments, the 4 different beams correspond to a sector comprising a 120 degree directional coverage range, e.g. with each beam corresponding to 30 degrees. Table 1001 also includes an average channel RSSI value for each channel, which is determined by averaging the four beam measurement values corresponding to the channel. First column 1002 includes channel identification information. Second column 1004 includes beam 1 RSSI measurement information. Third column 1006 includes beam 2 RSSI measurement information. Fourth column 1008 includes beam 3 RSSI measurement information. Fifth column 1010 includes beam 4 RSSI measurement information. Sixth column 1012 includes an average channel RSSI for each channel. Row 1014 includes channel 1 RSSI information including a RSSI measurement for each beam of the channel 1 and an average RSSI value for channel 1. Row 1016 includes channel 2 RSSI information including a RSSI measurement for each beam of the channel 2 and an average RSSI value for channel 2. Row 1018 includes channel 3 RSSI information including a RSSI measurement for each beam of the channel 3 and an average RSSI value for channel 3. Row 1020 includes channel 4 RSSI information including a RSSI measurement for each beam of the channel 4 and an average RSSI value for channel 4. Row 1022 includes channel 5 RSSI information including a RSSI measurement for each beam of the channel 5 and an average RSSI value for channel 5. Row 1024 includes channel 6 RSSI information including a RSSI measurement for each beam of the channel 6 and an average RSSI value for channel 6.

Box 1030 indicates that a channel RSSI exclusion threshold=−87 dBm is applied for the example of FIG. 8. The RSSI channel exclusion threshold is applied to each of the channel average RSSI values of column 1012. In this example, the channel 1 average RSSI value of −86 dBm is greater than the channel RSSI exclusion threshold of −87 dBm; therefore, channel is removed from further consideration for selection to be used to communicate control signals, as indicated by box 1034.

Box 1032 indicates that an individual beam RSSI exclusion threshold=−85 dBm is applied for the example of FIG. 8. The individual beam RSSI exclusion threshold is applied to each of the RSSI measurement values in columns 1004, 1006, 1008, and 1010. If one or more beam RSSI measurement values, corresponding to a channel exceeds the individual beam RSSI exclusion threshold, then that channel is excluded from further consideration to be selected to be used to communicate control signals. In this example, each of the individual beam RSSI values are less than the individual beam RSSI exclusion threshold of −85 dBm; therefore, none of the channels are removed from consideration for selection to be used to communication control signals, as indicated by box 1036.

The determinations of the exclusion criteria evaluations are implemented, and the remaining channels, are the set of channels={channel 2, channel 3, channel 4, channel 5, channel 6}, as indicated by box 1038. A set of one or more channels, which have the lowest average RSSI, is identified from the remaining set of channels. In this example the set of channel(s) with the lowest average RSSI={channel 4, channel 5), which each have the same RSSI=−90.5 dBm, as indicated by box 1040. Since multiple channels have the lowest average channel RSSI, a selection among the multiple channels is made in accordance with a predetermined rule. In this example, the predetermined rule is to select the channel with the lowest channel number. In this exemplary embodiment, the lower the channel number, the lower the frequency, and the lower the frequency, the lower the expected interference from other devices, e.g., other interfering terrestrial base stations, operating outside the range but adjacent to the control channel spectrum. Therefore channel 4, which is the lower number channel, is selected as the channel to be used to communicate control information, as indicated by box 1042.

FIG. 9 is a drawing 1100 illustrates an exemplary base station 1102, e.g., a sector base station, and four control channel beams (beam 1 1104, beam 2 1106, beam 3 1108 and beam 4 1110), in accordance with an exemplary embodiment. Exemplary base station 1102 is, e.g., any of the base stations (102, 104, 106, 108, 110, 112) of system 100 of FIG. 1, base station 500 of FIG. 3, and/or a base station implementing the method of flowchart 200 of FIG. 2.

FIG. 10 is a drawing 1200 which illustrates an exemplary TDD frame 1201 including four different time intervals (time interval T1 1204, time interval T2 1206, time interval T3 1208, time interval T4 1210), each of the four different timing intervals corresponding to a different beam (beam 1, beam 2, beam 3, beam 4), respectively. Drawing 1201 further indicates that the TDD frame and timing intervals are repeated, as indicated by another time interval T4 1202 corresponding to beam 4 (on the left side) and another time interval T1 1214 corresponding to beam 1 (on the right side). The timing structure shown in FIG. 10 is, e.g., used by the base station of FIG. 9.

FIG. 11 is a drawing 1300 which illustrates an example in which two alternative control channels (channel 1, channel 2) have the same average channel RSSI value; however, one of the two alternative control channels (channel 1) is rejected as a candidate for selection to be used to communicate control signals because an individual beam channel measurement exceeded a predetermined exclusion threshold. Table 1301 includes a set of measurements, wherein each of the different measurements corresponds to a different combination of channel and beam. Channel 1 and channel 2 are, e.g., different adjacent 100 MHz bands of spectrum. The different beams are, e.g., four different directional beams, e.g., as shown in FIG. 9. In some embodiments, the 4 different beams correspond to sector comprising a 120 degree directional coverage range, e.g. with each beam corresponding to 30 degrees. Table 1301 also includes an average channel RSSI value for each channel. First column 1302 includes channel identification information (channel 1, channel 2). Second column 1304 includes beam 1 RSSI measurement information. Third column 1306 includes beam 2 RSSI measurement information. Fourth column 1308 includes beam 3 RSSI measurement information. Fifth column 1310 includes beam 4 RSSI measurement information. Sixth column 1312 includes an average channel RSSI for each channel. Row 1314 includes channel 1 RSSI information including a RSSI measurement for each beam of the channel 1 and an average RSSI value for channel 1. Row 1316 includes channel 2 RSSI information including a RSSI measurement for each beam of the channel 2 and an average RSSI value for channel 2. In the example of FIG. 11, the average channel 1 RSSI value=−87.5 dBm, as indicated in entry 1318, and the average channel 2 RSSI value=−87.5 dBm, as indicated in entry 1320. In the example of FIG. 11, the individual channel beam measurement exclusion threshold is set to −85 dB. A review of the measurement data indicates that entry 1322, corresponding to channel 1 and beam 3, is −80.5 dBm, which is greater than −85 dBM; therefore, channel 1 is removed from consideration to be selected as the channel to be used for control communications.

Various aspects and/or features of some embodiments of the present invention are further described below. Various embodiments are directed to helping solve the control beam issue, e.g., interference problems with regard to control channels using wide control channel beams on shared spectrum (e.g., 600 Mz of shared bandwidth (37.0-37.6 GHz)), and helping communications service provider operators deploy in this band without having a SAS entity. The use of a SAS puts a lot of burden on deployments, e.g., in terms of cost, complexity, and backhaul overhead signaling.

The synchronization Signal Block (SSB) beam sweeps occur on wide beams. The UE measures the SSBs and selects the best SSB beam. The SSB beam is used to send the random access preamble in the random access occasion that maps to the respective wide beams of the chosen SSB. This procedure is called beam acquisition. This is a key process in cell selection, by a UE, and the wider nature of the control beams makes it susceptible to interference on the shared channel. It is desirable for a base station to detect, select, and use a control channel, from among a plurality of alternative candidate control channels, which will experience the lowest level of interference.

In some embodiments, in accordance with the present invention, a novel step is added before beam acquisition. A base station measures the RSSI at each potential control channel, which may be selected to be used by the base station, to identify the channel with least energy levels.

The mmWave radio/base station will tune to each and every channel with the shared spectrum band and measure RSSI. In one embodiment, the mmWave radio/base station will scan 100 Mhz channels within the 600 MHz of shared band.

These measurements are simple energy measurements and do not require any network information. After the base station measures the RSSI of each channel it will create a list of channels (e.g., a table or RSSI channel matrix) with the measured RSSI.

From the table the base station will pick a channel, e.g., the channel with the least amount of RSSI, and use it to transmit control information. The rest of the channels can be, and sometimes are, used for traffic with aggregation. The high level of directivity for the traffic beams (narrow traffic beams) makes a narrow traffic beam less susceptible to interference as compared to a wide control beam.

In some embodiments, an exemplary method includes: measuring RSSI on each channel, e.g. each of 6 channel of 100 MHz bandwidth. In some embodiments, measuring RSSI on a channel involves measuring RSSI on each of 4 control channel beams for the channel. The measured RSSI data is used to create a table. An average RSSI is calculated for each channel, by averaging the measured RSSIs corresponding to the four beams for the channel.

If an average RSSI for a channel is lower than a minimum threshold (indicating an acceptable level of interference) then the average RSSI is added to a table or list of candidate channels; however, if the RSSI is not lower than the minimum threshold (indicating an unacceptable level of interference) then the average RSSI is excluded from the table or list of candidate channels.

If the average RSSI value on each of the channels is higher than the minimum interference threshold then an interference alarm is triggered and operation is switched to an override procedure, e.g., an automatic or manual override procedure.

If the average RSSI for each channel is different than the channel with the lowest average RSSI is selected to be used by the base station.

The base station starts using the selected control channel, e.g., transmitting control data on the selected control channel, which may be detected by UEs. The other channels, e.g., other 100 MHz bands, which were not selected to be the control channel for the base station, may be, and sometimes are, used to transmit data traffic using narrow beams.

In some embodiments, during times of low activity this process of RSSI beam/channel combination measurements, averaging to determine an average RSSI for each potential control channel, and selection of a control channel to be used by the base station, is repeated, e.g., periodically during times of low activity to account for the deployment of new radios and other changes to the local environment.

Another aspect of some embodiments, involves making the RSSI measurements in certain timeslots on certain beams. For example, in one exemplary embodiment, each sector of each cell has 4 control channel beams that are time multiplexed. For example, drawing 1100 of FIG. 9 illustrates an exemplary sector base station 1102 which transmits 4 control channel beams (beam 1 1104, beam 2 1106, beam 3 1108 and beam 4 1110). The control channel beams are time multiplexed. In other words the control channel beam #1 1104 is active for a given time period, while control channel beam #2 1106, control channel beam #3 1108, and control channel beam #4 1110 are idle, and so on. This approach is illustrated in drawing 1200 of FIG. 12. So, for each control channel beam, the RSSI measurements can be restricted to the time period that the beam will be active, and this information can be added to the decision matrix for further enhancements, e.g. refinements, to the decision process. So the RSSI for beam 1 is measured during timeslot T1, the RSSI for beam 2 is measured during timeslot T2, and so on. For a channel, the individual beams RSSIs corresponding to the channel can then be combined into an RSSI for the channel (average channel RSSI) and used as described above, (e.g., select the channel with the lowest average RSSI), but there is now more granular information available that can be used to augment the decisions that are made. A table (matrix) of individual beam/channel RSSI measurements is available to be used in the selection process.

Consider the exemplary table 1300 of FIG. 11 which shows individual beam/channel RSSI values as well as average channel RSSIs for two channels, channel 1 and channel 2. Consider that channel 3 and channel 4 have already been excluded from further consideration, e.g., due to an average RSSI for channel 3 and channel 4 being above an acceptable threshold.

In the example of FIG. 11, the results for the channel RSSI (the average of the 4 beam RSSIs) is the same for both channels with a value of −87.5 dBm. However, in some embodiments, the network operator may, and sometimes does set of a rule, or a predetermined rule is implemented and used. For example, the rule is: no beam RSSI is to be above a threshold, e.g. −85 dBm, on a channel that is to be selected, e.g., to ensure network quality. This rule would disqualify channel 1 (because the channel 1/beam 3 RSSI value 1322 of −80 dBm is greater than the threshold of −85 dBm), even though 3 of the 4 beams corresponding to channel 1 have better RSSI than those of channel 2. Thus in this example, channel 2 is selected and used by the base station to transmit control signals.

Numbered List of Exemplary Method Embodiments

Method Embodiment 1. A communications method, the method comprising: performing (204) received signal strength indicator (RSSI) measurements for beams corresponding to multiple control channels being considered for selection, said performing RSSI measurements including performing (206) RSSI measurements for beams of a first control channel and performing (216) RSSI measurements for beams of a second control channel; generating (268) an average control channel RSSI value for each individual control channel under consideration for selection from RSSI values of individual beams; applying (283) one or more RSSI based channel exclusion criteria; excluding (364), from further consideration for selection, any control channels which satisfied an RSSI based channel exclusion criterion; and selecting (400), from one or more channels remaining under consideration for selection, a control channel to be used for communication of control signals.

Method Embodiment 2. The communications method of Method Embodiment 1, wherein generating (268) an average control channel RSSI value for each individual control channels under consideration for selection from RSSI values of individual beams includes: generating (270) an average first control channel RSSI value from RSSI values corresponding to a plurality of first channel beams; and generating (272) an average second control channel RSSI value from RSSI values corresponding to a plurality of second channel beams.

Method Embodiment 3. The method of Method Embodiment 2, wherein applying (283) one or more RSSI based channel exclusion criteria includes: i) comparing (286) the average first control channel RSSI value to a first threshold to determine if it is less than the first threshold; and ii) comparing (292) the average second control channel RSSI value to the first threshold to determine if it is less than the first threshold.

Method Embodiment 4. The method of Method Embodiment 3, wherein excluding (364) from further consideration for selection any control channels which satisfied an RSSI based channel exclusion criteria includes: i) excluding (368) from further consideration the first control channel when (e.g., in response to determining that) the average first control channel RSSI value is not determined to be less than the first threshold (e.g., average first control channel RSSI value is greater than or equal to the first threshold); and ii) excluding (370) from further consideration the second control channel when (e.g., in response to determining that) the average second control channel RSSI value is not determined to be less than the first threshold (e.g., average second control channel RSSI value is greater than or equal to the first threshold).

Method Embodiment 5. The method of Method Embodiment 3, wherein applying (283) one or more RSSI based channel exclusion criteria further includes: determining (326) if at least one measured beam RSSI value corresponding to the first control channel exceeds a second threshold; and determining (332) if at least one measured beam RSSI value corresponding to the second control channel exceeds the second threshold.

Method Embodiment 6. The method of Method Embodiment 5, wherein excluding (364) from further consideration for selection any control channels which satisfied an RSSI based channel exclusion criterion includes: i) excluding (380) from further consideration the first control channel when (e.g., in response to determining that) at least one measured beam RSSI value corresponding to the first control channel exceeds a second threshold (e.g., when one or more beams of the first control channel have a measured RSSI level over a predetermined interference level that indicates the channel should not be used due to at least one beam having a high level of interference as indicated by the RSSI value of a beam on the first channel exceeding the second threshold); and ii) i) excluding (382) from further consideration the second control channel when (e.g., in response to determining that) at least one measured beam RSSI value corresponding to the second control channel exceeds a second threshold (e.g., when one or more beams of the second control channel have a measured RSSI level over the predetermined interference level that indicates the channel should not be used due to at least one beam having a high level of interference as indicated by the RSSI value of a beam on the second channel exceeding the second threshold).

Method Embodiment 7. The method of Method Embodiment 3, further comprising: selecting (400) from one or more channels remaining under consideration for selection a control channel to be used for communication of control signals includes: identifying (402) a set of one or more control channels having a lowest average channel RSSI value from control channels remaining under consideration for selection.

Method Embodiment 7A. The method of Method Embodiment 7, further comprising: determining (404) if the identified set of one or more control channels having the lowest average channel RSSI value includes a single control channel or multiple control channels.

Method Embodiment 8. The method of Method Embodiment 7, wherein selecting (400), from one or more channels remaining under consideration for selection, a control channel to be used for communication of control signals further includes: selecting (406), when the set of one or more control channels having a lowest average channel RSSI value includes a single control channel, said single control channel as the control channel to be used for communication of control signals.

Method Embodiment 9. The method of Method Embodiment 7, wherein selecting (400) from one or more channels remaining under consideration for selection a control channel to be used for communication of control signals further includes: selecting (410), when the set of one or more control channels having a lowest average channel RSSI value includes multiple control channels, a lowest numbered (e.g., lowest frequency) control channel as the control channel to be used for communication of control signals.

Method Embodiment 9A. The method of Method Embodiment 9, wherein higher numbered (e.g., higher frequency) control channels are closer in frequency to a known band which is used by devices which generate interference than lower numbered control channels.

Method Embodiment 10. The method of Method Embodiment 4, wherein control channel beams are transmitted using a set of beams (e.g., 4 beams), each beam in the set of beams has a beam width which is a fraction (e.g. ¼) in terms of width of the area covered by the set of beams corresponding to a control channel (e.g., there are 4 different beams used to cover the composite beam area corresponding to a single control channel in some embodiments). (e.g., a control channel corresponds to a selected 100 MHz bandwidth, corresponds to a sector base station coverage angle of 120 degrees, corresponds to a set of four beams with each beam corresponding to a 30 degree angle.)

Method Embodiment 11. The method of Method Embodiment 10, further comprising: transmitting (414), using a control channel antenna beam, control information on the control channel selected to be used; and transmitting (416) traffic data using a traffic channel antenna beam which is narrower than the control channel antenna beam used to transmit control information.

Method Embodiment 11A. The method of Method Embodiment 11, wherein the control channel antenna beam is at least 10 times wider than the traffic channel antenna beam.

Method Embodiment 12. The method of Method Embodiment 11, determining (418) after selecting (400) from one or more channels remaining under consideration for selection, a control channel to be used for communication of control signals, that a predetermined amount of time has passed; and in response to determining that the preselected amount of time has passed, restarting (420) a measurement and selection process used to select a control channel to be used.

Numbered List of Exemplary Apparatus Embodiments

Apparatus Embodiment 1. A base station (e.g. a sector base station supporting beamforming) (102 or 500 or 1102) comprising: a wireless receiver (510); a plurality of antennas or antenna elements (520, . . . , 522); and a processor (502) configured to: operate the base station to perform (204) received signal strength indicator (RSSI) measurements for beams corresponding to multiple control channels being considered for selection, said performing RSSI measurements including performing (206) RSSI measurements for beams of a first control channel and performing (216) RSSI measurements for beams of a second control channel; generate (268) an average control channel RSSI value for each individual control channel under consideration for selection from RSSI values of individual beams; apply (283) one or more RSSI based channel exclusion criteria; exclude (364), from further consideration for selection, any control channels which satisfied an RSSI based channel exclusion criterion; and select (400), from one or more channels remaining under consideration for selection, a control channel to be used for communication of control signals.

Apparatus Embodiment 2. The base station of Apparatus Embodiment 1, wherein said processor (502) is configured to: generate (270) an average first control channel RSSI value from RSSI values corresponding to a plurality of first channel beams; and generate (272) an average second control channel RSSI value from RSSI values corresponding to a plurality of second channel beams, as part of being configured to generate (268) an average control channel RSSI value for each individual control channels under consideration for selection from RSSI values of individual beams.

Apparatus Embodiment 3. The base station of Apparatus Embodiment 2, wherein said processor (502) is configured to: i) compare (286) the average first control channel RSSI value to a first threshold to determine if it is less than the first threshold; and ii) compare (292) the average second control channel RSSI value to the first threshold to determine if it is less than the first threshold, as part of being configured to apply (283) one or more RSSI based channel exclusion criteria.

Apparatus Embodiment 4. The base station of Apparatus Embodiment 3, wherein said processor (502) is configured to: i) exclude (368) from further consideration the first control channel when (e.g., in response to determining that) the average first control channel RSSI value is not determined to be less than the first threshold (e.g., average first control channel RSSI value is greater than or equal to the first threshold); and ii) exclude (370) from further consideration the second control channel when (e.g., in response to determining that) the average second control channel RSSI value is not determined to be less than the first threshold (e.g., average second control channel RSSI value is greater than or equal to the first threshold), as part of being configured to exclude (364) from further consideration for selection any control channels which satisfied an RSSI based channel exclusion criteria.

Apparatus Embodiment 5. The base station of Apparatus Embodiment 3, wherein said processor (502) is configured to: determine (326) if at least one measured beam RSSI value corresponding to the first control channel exceeds a second threshold; and determine (332) if at least one measured beam RSSI value corresponding to the second control channel exceeds the second threshold, as part of being configured to apply (283) one or more RSSI based channel exclusion criteria.

Apparatus Embodiment 6. The base station of Apparatus Embodiment 5, wherein said processor (502) is configured to: i) exclude (380) from further consideration the first control channel when (e.g., in response to determining that) at least one measured beam RSSI value corresponding to the first control channel exceeds a second threshold (e.g., when one or more beams of the first control channel have a measured RSSI level over a predetermined interference level that indicates the channel should not be used due to at least one beam having a high level of interference as indicated by the RSSI value of a beam on the first channel exceeding the second threshold); and ii) i) exclude (382) from further consideration the second control channel when (e.g., in response to determining that) at least one measured beam RSSI value corresponding to the second control channel exceeds a second threshold (e.g., when one or more beams of the second control channel have a measured RSSI level over the predetermined interference level that indicates the channel should not be used due to at least one beam having a high level of interference as indicated by the RSSI value of a beam on the second channel exceeding the second threshold), as part of being configured to exclude (364) from further consideration for selection any control channels which satisfied an RSSI based channel exclusion criterion.

Apparatus Embodiment 7. The base station of Apparatus Embodiment 3, wherein said processor (502) is further configured to operate the base station to: select (400) from one or more channels remaining under consideration for selection a control channel to be used for communication of control signals includes: identify (402) a set of one or more control channels having a lowest average channel RSSI value from control channels remaining under consideration for selection.

7A. The base station of claim 7, wherein said processor (502) is further configured to: determine (404) if the identified set of one or more control channels having the lowest average channel RSSI value includes a single control channel or multiple control channels.

Apparatus Embodiment 8. The base station of Apparatus Embodiment 7, wherein said processor (502) is configured to: select (406), when the set of one or more control channels having a lowest average channel RSSI value includes a single control channel, said single control channel as the control channel to be used for communication of control signals, as part of being configured to select (400), from one or more channels remaining under consideration for selection, a control channel to be used for communication of control signals.

Apparatus Embodiment 9. The base station of Apparatus Embodiment 7, wherein said processor (502) is configured to: select (410), when the set of one or more control channels having a lowest average channel RSSI value includes multiple control channels, a lowest numbered (e.g., lowest frequency) control channel as the control channel to be used for communication of control signals, as part of being configured to select (400) from one or more channels remaining under consideration for selection a control channel to be used for communication of control signals.

Apparatus Embodiment 9A. The base station of Apparatus Embodiment 9, wherein higher numbered (e.g., higher frequency) control channels are closer in frequency to a known band which is used by devices which generate interference than lower numbered control channels.

Apparatus Embodiment 10. The base station of Apparatus Embodiment 4, wherein control channel beams are transmitted using a set of beams (e.g. 4 beams), each beam in the set of beams has a beam width which is a fraction (e.g. ¼) in terms of width of the area covered by the set of beams corresponding to a control channel (e.g., there are 4 different beams used to cover the composite beam area (sector area) corresponding to a single control channel in some embodiments). (e.g., a control channel corresponds to a selected 100 MHz bandwidth and a sector base station coverage angle of 120 degrees, which corresponds to a set of four beams with each beam corresponding to a 30 degree angle.)

Apparatus Embodiment 11. The base station of Apparatus Embodiment 10, further comprising: a wireless transmitter (512); and wherein said processor (502) is further configured to: operate the base station to transmit (414) (e.g. via wireless transmitter 512), using a control channel antenna beam, control information on the control channel selected to be used; and operate the base station to transmit (416) traffic data using a traffic channel antenna beam which is narrower than the control channel antenna beam used to transmit control information.

Apparatus Embodiment 11A. The base station of Apparatus Embodiment 11, wherein the control channel antenna beam is at least 10 times wider than the traffic channel antenna beam.

Apparatus Embodiment 12. The base station of Apparatus Embodiment 11, wherein said processor (502) is further configured to: determine (418) after selecting (400) from one or more channels remaining under consideration for selection, a control channel to be used for communication of control signals, that a predetermined amount of time has passed; and in response to determining that the preselected amount of time has passed, restart (420) a measurement and selection process used to select a control channel to be used.

Numbered List of Exemplary Non-Transitory
Computer Readable Medium Embodiments

Non-Transitory Computer Readable Medium Embodiment 1. A non-transitory computer readable medium (510) including machine executable instructions which when executed by a processor (502) of a base station (102 or 500) cause the base station (102 or 500) to perform the steps of: performing (204) received signal strength indicator (RSSI) measurements for beams corresponding to multiple control channels being considered for selection, said performing RSSI measurements including performing (206) RSSI measurements for beams of a first control channel and performing (216) RSSI measurements for beams of a second control channel; generating (268) an average control channel RSSI value for each individual control channel under consideration for selection from RSSI values of individual beams; applying (283) one or more RSSI based channel exclusion criteria; excluding (364), from further consideration for selection, any control channels which satisfied an RSSI based channel exclusion criterion; and selecting (400), from one or more channels remaining under consideration for selection, a control channel to be used for communication of control signals.

Various embodiments are directed to apparatus, e.g., base stations, e.g. sector base stations, such as gNB, ng-eNBs, eNBs, etc. supporting beamforming, UEs, base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. a sector base station, such as gNB, ng-eNB, eNB, etc., supporting beamforming, UEs, a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, an AFC system, cable networks, cloud networks, nodes, servers, cloud service servers, customer premises equipment devices, controllers, network monitoring nodes and/or servers and/or cable or network equipment devices. Various embodiments are directed to communications networks which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, a AFC system, etc., said device including a processor configured to implement one, multiple or all of the steps of one or more methods of the invention.

In some embodiments, the processor or processors, e.g., CPUs, of one or more devices, e.g., a base station, e.g. a sector base station, such as gNB, ng-eNB, eNB, etc., supporting beamforming, a UE, a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as a base station, e.g. a sector base station, such as gNB, ng-eNB, eNB, etc., supporting beamforming, a UE, a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g., a sector base station, such as gNB, ng-eNB, eNB, etc., supporting beamforming, a UE, a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, MNVO base station, e.g., a CBSD, an MNO cellular base station, e.g., an eNB or a gNB, a UE device or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method, the method comprising:
   performing received signal strength indicator (RSSI) measurements for beams corresponding to multiple control channels being considered for selection, said performing RSSI measurements including performing RSSI measurements for beams of a first control channel and performing RSSI measurements for beams of a second control channel;
   generating an average control channel RSSI value for each individual control channel under consideration for selection from RSSI values of individual beams;
   applying one or more RSSI based channel exclusion criteria, said step of applying one or more RSSI based channel exclusion criteria including:
      comparing an average first control channel RSSI value to a first threshold to determine if the average first control channel RSSI value is less than the first threshold;
      comparing an average second control channel RSSI value to the first threshold to determine if the average second control channel RSSI value is less than the first threshold;
      determining if at least one measured beam RSSI value corresponding to the first control channel exceeds a second threshold; and
      determining if at least one measured beam RSSI value corresponding to the second control channel exceeds the second threshold;
   the method further including the steps of:
   excluding, from further consideration for selection, any control channels which satisfied an RSSI based channel exclusion criterion, said step of excluding, from further consideration for selection, any control channels which satisfied an RSSI based channel exclusion criterion including:
      i) excluding from further consideration the first control channel when at least one measured beam RSSI value corresponding to the first control channel exceeds the second threshold; and
      ii) excluding from further consideration the second control channel when at least one measured beam RSSI value corresponding to the second control channel exceeds the second threshold; and
   selecting, from one or more channels remaining under consideration for selection, a control channel to be used for communication of control signals.

2. The communications method of claim 1, wherein generating an average control channel RSSI value for each individual control channel under consideration for selection from RSSI values of individual beams includes:
   generating the average first control channel RSSI value from RSSI values corresponding to a plurality of first channel beams; and
   generating the average second control channel RSSI value from RSSI values corresponding to a plurality of second channel beams.

3. The method of claim 2,
   wherein applying one or more RSSI based channel exclusion criteria further includes:
   excluding from further consideration the first control channel when the average first control channel RSSI value is not determined to be less than the first threshold.

4. The method of claim 3, wherein excluding from further consideration for selection any control channels which satisfied an RSSI based channel exclusion criteria further includes:
   excluding from further consideration the second control channel when the average second control channel RSSI value is not determined to be less than the first threshold.

5. The method of claim 1, further comprising:
   transmitting, using a control channel antenna beam, control information on the control channel selected to be used; and
   transmitting traffic data using a traffic channel antenna beam which is narrower than the control channel antenna beam used to transmit control information.

6. The method of claim 1, further comprising:
   transmitting, using a control channel antenna beam, control information on the control channel selected to be used.

7. The method of claim 1, further comprising:
   transmitting control channel beams using a set of beams, each beam in the set of beams having a beam width which is a fraction in terms of width of the area covered by the set of beams corresponding to a control channel.

8. The method of claim 1, further comprising:
   transmitting, using a control channel antenna beam, control information on the control channel selected to be used; and
   transmitting traffic data using a traffic channel antenna beam which is narrower than the control channel antenna beam used to transmit control information.

9. The method of claim 8, further comprising:
   determining, after selecting, from one or more channels remaining under consideration for selection, a control channel to be used for communication of control signals, that a predetermined amount of time has passed; and
   in response to determining that the preselected amount of time has passed, restarting a measurement and selection process used to select a control channel to be used.

10. A communications method, the method comprising:
    performing received signal strength indicator (RSSI) measurements for beams corresponding to multiple control channels being considered for selection, said performing RSSI measurements including performing RSSI measurements for beams of a first control channel and performing RSSI measurements for beams of a second control channel;
generating an average control channel RSSI value for each individual control channel under consideration for selection from RSSI values of individual beams;
applying one or more RSSI based channel exclusion criteria, said step of applying one or more RSSI based channel exclusion criteria including:
 comparing an average first control channel RSSI value to a first threshold to determine if the average first control channel RSSI value is less than the first threshold; and
 comparing an average second control channel RSSI value to the first threshold to determine if the average second control channel RSSI value is less than the first threshold;
the method further comprising:
excluding, from further consideration for selection, any control channels which satisfied an RSSI based channel exclusion criterion; and
selecting, from one or more channels remaining under consideration for selection, a control channel to be used for communication of control signals, said selecting including:
 identifying a set of one or more control channels having a lowest average channel RSSI value from control channels remaining under consideration for selection.

11. The method of claim 10, wherein selecting, from one or more channels remaining under consideration for selection, a control channel to be used for communication of control signals further includes:
selecting, when the set of one or more control channels having a lowest average channel RSSI value includes a single control channel, said single control channel as the control channel to be used for communication of control signals.

12. The method of claim 10, wherein selecting from one or more channels remaining under consideration for selection a control channel to be used for communication of control signals further includes:
selecting, when the set of one or more control channels having a lowest average channel RSSI value includes multiple control channels, a lowest numbered control channel as the control channel to be used for communication of control signals.

13. A base station comprising:
a wireless receiver;
a plurality of antennas or antenna elements; and
a processor configured to:
 operate the base station to perform received signal strength indicator (RSSI) measurements for beams corresponding to multiple control channels being considered for selection, said performing RSSI measurements including performing RSSI measurements for beams of a first control channel and performing RSSI measurements for beams of a second control channel;
 generate an average control channel RSSI value for each individual control channel under consideration for selection from RSSI values of individual beams;
 apply one or more RSSI based channel exclusion criteria, said processor being configured, as part of being configured to apply or more RSSI based channel exclusion criteria to:
 compare an average first control channel RSSI value to a first threshold to determine if the average first control channel RSSI value is less than the first threshold;
 compare an average second control channel RSSI value to the first threshold to determine if the average second control channel RSSI value is less than the first threshold;
 determine if at least one measured beam RSSI value corresponding to the first control channel exceeds a second threshold; and
 determine if at least one measured beam RSSI value corresponding to the second control channel exceeds the second threshold;
the processor being further configured to:
exclude, from further consideration for selection, any control channels which satisfied an RSSI based channel exclusion criterion; and
select, from one or more channels remaining under consideration for selection, a control channel to be used for communication of control signals.

14. The base station of claim 13, wherein said processor is configured to:
generate the average first control channel RSSI value from RSSI values corresponding to a plurality of first channel beams; and
generate the average second control channel RSSI value from RSSI values corresponding to a plurality of second channel beams,
as part of being configured to generate an average control channel RSSI value for each individual control channel under consideration for selection from RSSI values of individual beams.

15. The base station of claim 14, wherein said processor is configured, as part of being configured to exclude from further consideration for selection any control channels which satisfied an RSSI based channel exclusion criteria, to:
exclude from further consideration the first control channel when the average first control channel RSSI value is not determined to be less than the first threshold.

16. The base station of claim 15, wherein said processor is configured, as part of being configured to exclude from further consideration for selection any control channels which satisfied an RSSI based channel exclusion criteria, to:
exclude from further consideration the second control channel when the average second control channel RSSI value is not determined to be less than the first threshold.

17. The base station of claim 15, wherein said processor is further configured to operate the base station to:
select from one or more channels remaining under consideration for selection a control channel to be used for communication of control signals; and
wherein said processor is configured to operate the base station to identify a set of one or more control channels having a lowest average channel RSSI value from control channels remaining under consideration for selection, as part of being configured to operate the base station to: select from one or more channels remaining under consideration for selection a control channel to be used for communication of control signals.

18. A base station comprising:
a wireless receiver;
a plurality of antennas or antenna elements; and
a processor configured to:
   operate the base station to perform received signal strength indicator (RSSI) measurements for beams corresponding to multiple control channels being considered for selection, said performing RSSI measurements including performing RSSI measurements for beams of a first control channel and performing RSSI measurements for beams of a second control channel;
   generate an average control channel RSSI value for each individual control channel under consideration for selection from RSSI values of individual beams;
   apply one or more RSSI based channel exclusion criteria, said processor being configured, as part of being configured to apply or more RSSI based channel exclusion criteria to:
   compare an average first control channel RSSI value to a first threshold to determine if the average first control channel RSSI value is less than the first threshold;
   compare an average second control channel RSSI value to the first threshold to determine if the average second control channel RSSI value is less than the first threshold;
   determine if at least one measured beam RSSI value corresponding to the first control channel exceeds a second threshold; and
   determine if at least one measured beam RSSI value corresponding to the second control channel exceeds the second threshold.

19. The base station of claim 18, wherein said processor is configured to:
i) exclude from further consideration the first control channel when at least one measured beam RSSI value corresponding to the first control channel exceeds the second threshold; and
ii) exclude from further consideration the second control channel when at least one measured beam RSSI value corresponding to the second control channel exceeds the second threshold, as part of being configured to exclude from further consideration for selection any control channels which satisfied an RSSI based channel exclusion criterion.

20. A non-transitory computer readable medium including machine executable instructions, which when executed by a processor of a base station, cause the base station to perform the steps of:
   performing received signal strength indicator (RSSI) measurements for beams corresponding to multiple control channels being considered for selection, said performing RSSI measurements including performing RSSI measurements for beams of a first control channel and performing RSSI measurements for beams of a second control channel;
   generating an average control channel RSSI value for each individual control channel under consideration for selection from RSSI values of individual beams;
   applying one or more RSSI based channel exclusion criteria, said step of applying one or more RSSI based channel exclusion criteria including:
      comparing an average first control channel RSSI value to a first threshold to determine if the average first control channel RSSI value is less than the first threshold;
      comparing an average second control channel RSSI value to the first threshold to determine if the average second control channel RSSI value is less than the first threshold;
      determining if at least one measured beam RSSI value corresponding to the first control channel exceeds a second threshold; and
      determining if at least one measured beam RSSI value corresponding to the second control channel exceeds the second threshold;
   excluding, from further consideration for selection, any control channels which satisfied an RSSI based channel exclusion criterion; and
   selecting, from one or more channels remaining under consideration for selection, a control channel to be used for communication of control signals.

* * * * *